US011489163B2

(12) United States Patent
Makino et al.

(10) Patent No.: US 11,489,163 B2
(45) Date of Patent: Nov. 1, 2022

(54) BINDER COMPOSITION FOR ALL-SOLID STATE SECONDARY BATTERY, SOLID ELECTROLYTE COMPOSITION, SOLID ELECTROLYTE-CONTAINING SHEET, ALL-SOLID STATE SECONDARY BATTERY, METHOD OF MANUFACTURING SOLID ELECTROLYTE-CONTAINING SHEET, AND METHOD OF MANUFACTURING ALL-SOLID STATE SECONDARY BATTERY

(71) Applicant: FUJIFILM Corporation, Tokyo (JP)

(72) Inventors: Masaomi Makino, Kanagawa (JP); Hiroaki Mochizuki, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 240 days.

(21) Appl. No.: 16/842,767

(22) Filed: Apr. 8, 2020

(65) Prior Publication Data

US 2020/0235399 A1    Jul. 23, 2020

Related U.S. Application Data

(63) Continuation of application No. PCT/JP2018/037995, filed on Oct. 11, 2018.

(30) Foreign Application Priority Data

Oct. 12, 2017  (JP) .............................. JP2017-198509

(51) Int. Cl.
*H01M 4/62* (2006.01)
*H01M 4/139* (2010.01)
*H01M 10/0562* (2010.01)
*H01M 10/058* (2010.01)

(52) U.S. Cl.
CPC ........... *H01M 4/622* (2013.01); *H01M 4/139* (2013.01); *H01M 10/058* (2013.01); *H01M 10/0562* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 9,105,939 B2 | 8/2015 | Matsuyama et al. | |
| 2016/0365604 A1 | 12/2016 | Mimura et al. | |
| 2018/0254519 A1 | 9/2018 | Maeda et al. | |
| 2018/0277891 A1 | 9/2018 | Mimura et al. | |
| 2018/0342765 A1* | 11/2018 | Mimura | H01M 10/0562 |
| 2020/0109055 A1* | 4/2020 | Czaplewski-Campbell | A01N 31/16 |

FOREIGN PATENT DOCUMENTS

| | | | |
|---|---|---|---|
| JP | 2001014387 | 1/2001 | |
| JP | 2009245925 | 10/2009 | |
| JP | 2010182626 | 8/2010 | |
| JP | 2011014387 | 1/2011 | |
| JP | 2012014929 | 1/2012 | |
| JP | 2012221749 | 11/2012 | |
| JP | 2013008611 | 1/2013 | |
| JP | 2013058362 | 3/2013 | |
| JP | 2015159067 | 9/2015 | |
| WO | 2017047378 | 3/2017 | |
| WO | 2017099248 | 6/2017 | |
| WO | WO 2017/131093 | * | 8/2017 |

OTHER PUBLICATIONS

"International Search Report (Form PCT/ISA/210) of PCT/JP2018/037995," dated Jan. 8, 2019, with English translation thereof, pp. 1-4.
"Written Opinion of the International Searching Authority (Form PCT/ISA/237) of PCT/JP2018/037995," dated Jan. 8, 2019, with English translation thereof, pp. 1-7.
"Office Action of Japan Counterpart Application", dated Mar. 16, 2021, with English translation thereof, p. 1-p. 6.

* cited by examiner

*Primary Examiner* — Anca Eoff
(74) *Attorney, Agent, or Firm* — JCIPRNET

(57) ABSTRACT

Provided are a binder composition for an all-solid state secondary battery, a solid electrolyte-containing sheet, an all-solid state secondary battery, and a method of manufacturing a solid electrolyte-containing sheet, and a method of manufacturing an all-solid state secondary battery. The binder composition for an all-solid state secondary battery includes polymer particles (A) and a non-aqueous dispersion medium (B), in which the polymer particles (A) are formed of a graft polymer not including a surfactant and having two or more peaks in a scattering intensity distribution measured by a dynamic light scattering particle size distribution analyzer, and a moisture content of the composition is 100 ppm or lower by mass.

14 Claims, 2 Drawing Sheets

BINDER COMPOSITION FOR ALL-SOLID STATE SECONDARY BATTERY, SOLID ELECTROLYTE COMPOSITION, SOLID ELECTROLYTE-CONTAINING SHEET, ALL-SOLID STATE SECONDARY BATTERY, METHOD OF MANUFACTURING SOLID ELECTROLYTE-CONTAINING SHEET, AND METHOD OF MANUFACTURING ALL-SOLID STATE SECONDARY BATTERY

CROSS-REFERENCE TO RELATED APPLICATIONS

This application is a Continuation of PCT International Application No. PCT/JP2018/037995 filed on Oct. 11, 2018, which claims priority under 35 U.S.C. § 119 (a) to Japanese Patent Application No. 2017-198509 filed in Japan on Oct. 12, 2017. Each of the above applications is hereby expressly incorporated by reference, in its entirety, into the present application.

BACKGROUND OF THE INVENTION

1. Field of the Invention

The present invention relates to a binder composition for an all-solid state secondary battery, a solid electrolyte-containing sheet, an all-solid state secondary battery, and a method of manufacturing a solid electrolyte-containing sheet, and a method of manufacturing an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in reliability and safety.

Under these circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety or reliability which is considered as a problem of batteries in which the organic electrolytic solution is used can be significantly improved, and it also becomes possible to extend the service lives. Further, an all-solid state secondary battery may have a structure in which electrodes and an electrolyte are directly disposed in series. Therefore, the energy density can be further increased as compared to a secondary battery in which an organic electrolytic solution is used, and the application to an electric vehicle or a large-sized storage battery is expected.

Due to the above-described advantageous effects, all-solid state secondary batteries have been developed as the next-generation lithium ion batteries. For example, JP2011-014387A and JP2013-008611A describe an all-solid state secondary battery in which a state of an interface between solid particles of an inorganic solid electrolyte or the like is adjusted using a binder.

SUMMARY OF THE INVENTION

Recently, the development of an all-solid state secondary battery has rapidly progressed. Along with the progress of the development, demands for improvement of manufacturing efficiency of an all-solid state secondary battery, improvement of performance of an all-solid state secondary battery such as ion conductivity, and suppression of performance deterioration during use have increased.

However, in the all-solid state secondary battery described in JP2011-014387A and JP2013-008611A, in the process of manufacturing, cracking may occur in a solid electrolyte layer and/or an electrode active material layer such that the manufacturing efficiency deteriorates. Further, due to pressurization during use, cracking may occur in a solid electrolyte layer and/or an electrode active material layer such that the battery performance deteriorates.

An object of the present invention is to provide a binder composition for an all-solid state secondary battery as a material forming a layer of an all-solid state secondary battery, with which an all-solid state secondary battery can be obtained in which the occurrence of cracking in a solid electrolyte layer and/or an electrode active material layer in the process of manufacturing the all-solid state secondary battery can be suppressed, a high ion conductivity can be imparted to the obtained all-solid state secondary battery, and further cracking caused by pressurization during use of the battery is not likely to occur in the solid electrolyte layer and/or the electrode active material layer such that deterioration in battery performance during use can be suppressed. In addition, another object of the present invention is to provide a solid electrolyte-containing sheet and an all-solid state secondary battery obtained using the above-described binder composition for an all-solid state secondary battery. Further, still another object of the present invention is to provide a method of manufacturing the above-described solid electrolyte-containing sheet and a method of manufacturing an all-solid state secondary battery.

As a result of thorough investigation by the present inventors, it was found that, by using a binder composition for an all-solid state secondary battery including polymer particles (A) and a non-aqueous dispersion medium (B) and having a moisture content of a specific value or lower as a material forming a layer of an all-solid state secondary battery, an all-solid state secondary battery can be obtained in which the occurrence of cracking in a solid electrolyte layer and/or an electrode active material layer in the process of manufacturing the all-solid state secondary battery can be suppressed, a high ion conductivity can be imparted to the obtained all-solid state secondary battery, and further cracking caused by pressurization during use of the battery is not likely to occur in the solid electrolyte layer and/or the electrode active material layer such that deterioration in battery performance during use can be suppressed, the graft polymer having two or more peaks in a scattering intensity distribution measured by a dynamic light scattering particle size distribution analyzer. The present invention has been completed based on the above findings as a result of repeated investigation.

That is, the above-described objects have been achieved by the following means.

<1> A binder composition for an all-solid state secondary battery comprising polymer particles (A) and a non-aqueous dispersion medium (B), in which the polymer particles (A) are formed of a graft polymer not including a surfactant and having two or more peaks in a scattering intensity distribution measured by a dynamic light scattering particle size distribution analyzer, and a moisture content of the composition is 100 ppm or lower by mass.

<2> The binder composition for an all-solid state secondary battery according to <1>, in which among the two or more peaks in the scattering intensity distribution, a peak (Pa) of a minimum particle size is in a range of 10 nm or more and less than 200 nm and a peak (Pb) of a maximum particle size is in a range of 200 nm or more and less than 1000 nm, <3> The binder composition for an all-solid state secondary battery according to <2>, in which a relationship between the peak (Pa) of the minimum particle size and the peak (Pb) of the maximum particle size satisfies the following Expression (1), $$0.05 \leq Pa/Pb \approx 0.75 \quad (1).$$

<4> The binder composition for an all-solid state secondary battery according to any one of <1> to <3>, in which the polymer particles (A) include a repeating unit derived from a (meth)acrylic acid ester.

<5> The binder composition for an all-solid state secondary battery according to any one of <1> to <4>, in which the polymer particles (A) are formed of a graft polymer having at least one functional group selected from the following group of functional groups, Group of Functional Groups a hydroxy group, a carboxy group or a salt thereof a sulfonate group or a salt thereof, a phosphate group or a salt thereof, a cyano group, and an amino group or a salt thereof.

<6> The binder composition for an all-solid state secondary battery according to any one of <1> to <5>, in which a graft portion of the polymer particles A) has an alkyl group having 6 to 18 carbon atoms.

<7> The binder composition for an all-solid state secondary battery according to any one of <1> to <6>, in which the non-aqueous dispersion medium (B) is at least one of a hydrocarbon compound solvent, a ketone compound solvent, an ether compound solvent, an ester compound solvent, or a nitrile compound solvent.

<8> The binder composition for an all-solid state secondary battery according to any one of <1> to <7>, further comprising an inorganic solid electrolyte (C) having ion conductivity of a metal belonging to Group 1 or Group 2 in the periodic table.

<9> The binder composition for an all-solid state secondary battery according to <8>, further comprising an active material (D).

<10> The binder composition for an all-solid state secondary battery according to <8> or <9>, further comprising a conductive auxiliary agent (E).

<11> A solid electrolyte-containing sheet comprising a layer that is formed of the binder composition for an all-solid state secondary battery according to any one of <8> to <10>.

<12> An all-solid state secondary battery comprising a positive electrode active material layer, a negative electrode active material layer, and a solid electrolyte layer, in which at least one of the positive electrode active material layer, the negative electrode active material layer, or the solid electrolyte layer is the solid electrolyte-containing sheet according to <11>.

<13> A method of manufacturing a solid electrolyte-containing sheet comprising a step of applying the binder composition for an all-solid state secondary battery according to any one of <8> to <10> to a substrate.

<14> A method of manufacturing an all-solid state secondary battery comprising manufacturing the all-solid state secondary battery through the method according to <13>.

With the binder composition for an all-solid state secondary battery according to the present invention, an all-solid state secondary battery can be obtained in which the occurrence of cracking in a solid electrolyte layer and/or an electrode active material layer in the process of manufacturing the all-solid state secondary battery can be suppressed, a high ion conductivity can be imparted to the obtained all-solid state secondary battery, and further cracking caused by pressurization during use of the battery is not likely to occur in the solid electrolyte layer and/or the electrode active material layer such that deterioration in battery performance during use can be suppressed. The solid electrolyte-containing sheet and the all-solid state secondary battery according to the present invention includes the solid electrolyte layer and/or the electrode active material layer in Which cracking caused by pressurization is not likely to occur. As a result, a high ion conductivity is exhibited. Further, in the method of manufacturing the solid electrolyte-containing sheet and the method of manufacturing the all-solid state secondary battery according to the present invention, a solid electrolyte-containing sheet and an all-solid state secondary battery having the above-described excellent characteristics can be manufactured.

DESCRIPTION OF THE PREFERRED EMBODIMENTS

Figure 1:
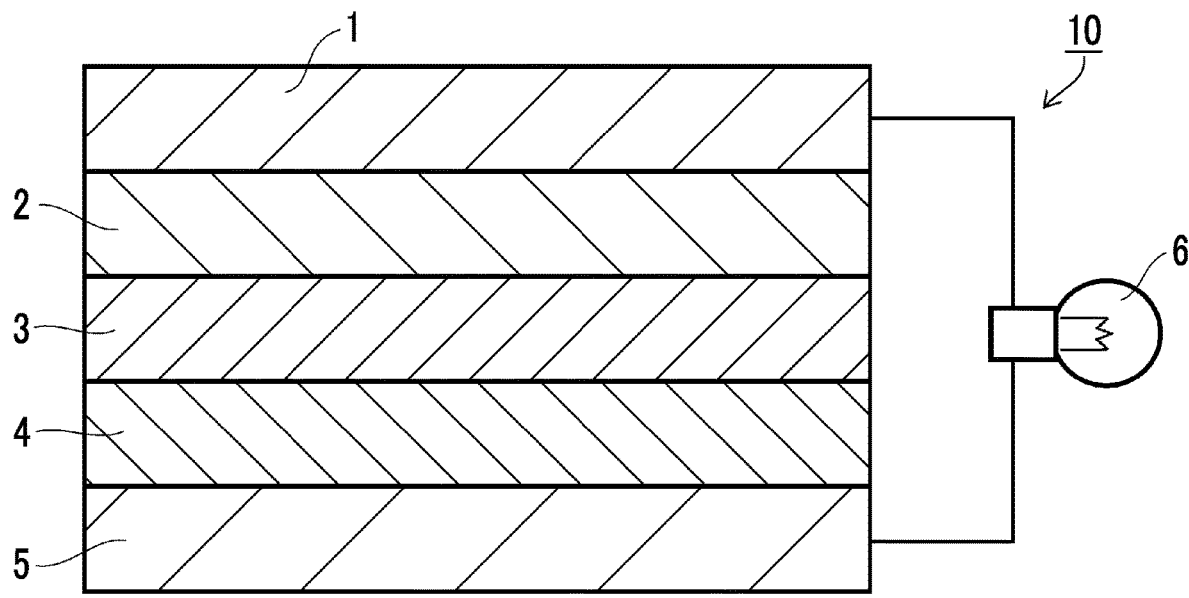
FIG. 1 is a vertical cross-sectional view schematically illustrating an all-solid state secondary battery according to a preferred embodiment of the present invention.

In the present specification, numerical ranges represented by "to" include numerical values before and after "to" as lower limit values and upper limit values. In the description of the present specification, "(meth)acryl" refers to methacryl and/or acryl. In addition, in the description of the present invention, "(meth)acryloyl" refers to methacryloyl and/or acryloyl.

Binder Composition for All-Solid State Secondary Battery

A binder composition for an all-solid state secondary battery according to an embodiment of the present invention includes polymer particles (A) and a non-aqueous dispersion medium (B), in which a moisture content is 100 ppm or lower. The polymer particles (A) are formed of a graft polymer not including a surfactant and having two or more peaks in a scattering intensity distribution measured by a dynamic light scattering particle size distribution analyzer.

In the binder composition for an all-solid state secondary battery according to the embodiment of the present invention, the moisture content (water content) is preferably 50 ppm or lower, more preferably 25 ppm or lower, still more preferably 20 ppm or lower, still more preferably 10 ppm or lower, and still more preferably 5 ppm or lower. In a case where the moisture content of the solid electrolyte composition is low, the deterioration of the inorganic solid electrolyte (C) can be suppressed. The moisture content refers to the amount of water in the binder composition for an all-solid state secondary battery (a mass ratio thereof to the binder composition for an all-solid state secondary battery), and specifically refers to a value measured by Karl Fischer titration after filtering the binder composition for an all-solid state secondary battery through a membrane filter having a pore size of 0.02 μm. The content of the non-aqueous dispersion medium (B) described below also refers to a value measured using this method.

The polymer particles (A) used in the present invention are polymer particles obtained by emulsion polymerization. The polymer particles (A) used in the present invention are graft polymer particles (preferably (meth)acrylic polymer particles) not including a surfactant. Here, "the polymer particles (A) not including a surfactant" represents that the surfactant does not substantially form a covalent bond with the polymer particles (A) or is not substantially adsorbed on the polymer particles (A). However, within a range where the effects of the present invention do not deteriorate, a small amount of the surfactant may be adsorbed on the polymer particles (A). For example, in a case where the content of the surfactant is 1 mass % or lower with respect to 100 mass % of the polymer particles (A), these polymer particles can be suitably used as the polymer particles (A) not including a surfactant. For example, a dispersion liquid of the polymer particles (A) are centrifugally separated using a centrifugal separator at a rotation speed of 30000 rpm for 3 hours to be separated into a supernatant liquid and a precipitate, and the mass of a surfactant in the supernatant liquid is obtained. As a result, the content of the surfactant in the polymer particles (A) can be calculated.

A form of a main chain and a graft portion of the graft polymer may be any one of a block or a random form. Here, "the graft portion of the graft polymer" refers to all the molecular chains (a long molecular chain or a short molecular chain) other than a main chain among all the molecular chains in the graft polymer, and refers to a molecular chain (for example, a linear molecular chain) that can be considered as a branch or a pendant with respect to the main chain. Typically, the longest chain among the molecular chains forming the graft polymer is the main chain.

Specific examples of monomers used for the synthesis of the polymer particles (A) according to the embodiment of the present invention include a (meth)acrylic acid ester, an α,β-unsaturated nitrile compound, an unsaturated carboxylic acid, a conjugated diene compound, an aromatic vinyl compound, a fluorine-containing monomer, and a macromonomer. As each of the monomers, one kind may be used alone, or two or more kinds may be used in combination.

1. (Meth)Acrylic Acid Ester

Specific examples of the (meth)acrylic acid ester include an alkyl ester of (meth)acrylic acid, a cycloalkyl ester of (meth)acrylic acid, an alkenyl ester of (meth)acrylic acid, a hydroxyalkyl ester of (meth)acrylic acid, and a poly(meth)acrylic acid ester of a polyhydric alcohol.

The alkyl group in the alkyl ester of (meth)acrylic acid may be chain-like or cyclic, and the number of carbon atoms in the alkyl group is preferably 1 to 30, more preferably 1 to 18, and still more preferably 1 to 12. The alkyl group may have a substituent.

Examples of the alkyl ester of (meth)acrylic acid include methyl (meth)acrylate, ethyl (meth)acrylate, n-propyl (meth)acrylate, i-propyl (meth)acrylate, n-butyl (meth)acrylate, i-butyl (meth)acrylate, n-amyl (meth)acrylate, i-amyl (meth)acrylate, hexyl (meth)acrylate, 2-ethylhexyl (meth)acrylate, n-octyl (meth)acrylate, nonyl (meth)acrylate, decyl (meth)acrylate, dodecyl (meth)acrylate, stearyl (meth)acrylate, benzyl (meth)acrylate, glycidyl (meth)acrylate, furfuryl (meth)acrylate, polyethylene glycol monomethyl monomethacrylate, 2-hydroxyethyl acrylate, and cyclohexyl (meth)acrylate.

The alkenyl group in the alkenyl ester of (meth)acrylic acid may be chain-like or cyclic, and the number of carbon atoms in the alkenyl group is preferably 2 to 30, more preferably 2 to 18, and still more preferably 2 to 12.

Examples of the alkenyl ester of (meth)acrylic acid include allyl (meth)acrylate and ethylene di(meth)acrylate.

The alkyl group in the hydroxyalkyl ester of (meth)acrylic acid has the same definition and the same preferable range as the alkyl group in the alkyl ester of (meth)acrylic acid.

Examples of the hydroxyalkyl ester of (meth)acrylic acid include hydroxymethyl (meth)acrylate and hydroxyethyl (meth)acrylate.

The polyhydric alcohol in the poly(meth)acrylic acid ester of the polyhydric alcohol is preferably a dihydric to octahydric alcohol, more preferably a dihydric to hexahydric alcohol, and still more preferably a dihydric to tetrahydric alcohol. The number of carbon atoms in the alcohol is preferably 2 to 30, more preferably 2 to 18, and still more preferably 2 to 12.

Examples of the poly(meth)acrylic acid ester of the polyhydric alcohol include ethylene glycol (meth)acrylate, diethylene glycol (meth)acrylate, propylene glycol (meth)acrylate, trimethylolpropane tri(meth)acrylate, pentaerythritol tetra(meth)acrylate, and dipentaerythritol hexa(meth)acrylate.

Among these, an alkyl ester of (meth)acrylic acid is preferable, methyl (meth)acrylate, ethyl (meth)acrylate, or 2-ethylhexyl acrylate is more preferable, and methyl (meth)acrylate is still more preferable.

As the repeating unit forming the polymer particles (A), only a repeating unit derived from a (meth)acrylic acid ester may be used alone, or not only a repeating unit derived from a (meth)acrylic acid ester but also a repeating unit derived from another unsaturated monomer that is copolymerizable may also be used.

The content ratio of the repeating unit derived from a (meth)acrylic acid ester to the polymer particles (A) is preferably 30 mass % or higher, more preferably 50 mass % or higher, still more preferably 65 mass % or higher, and still more preferably 75 mass % or higher. Examples of the other unsaturated monomer include compounds described below.

2. α,β-Unsaturated Nitrile Compound

In a case where the polymer particles (A) include a repeating unit derived an α,β-unsaturated nitrile compound, a hydrogen bond between polymer molecular chains can be strengthened, and a high mechanical strength can be obtained. That is, a network structure formed of a polymer chain is formed due to the presence of a cyano group. Therefore, high modulus of elasticity and high breaking elongation can be obtained, and excellent charging-discharging characteristics can be realized.

Specific examples of the α,β-unsaturated nitrite compound include acrylonitrile, methacrylonitrile, α-chloroacrylonitrile, α-ethylacrylonitrile, and vinylidene cyanide. Among these, acrylonitrile or methacrylonitrile is preferable, and acrylonitrile is more preferable.

The content ratio of the constitutional unit derived from the α,β-unsaturated nitrile compound to the polymer particles (A) is preferably 35 mass % or lower and more preferably 10 to 25 mass %.

3. Unsaturated Carboxylic Acid

In a case where the polymer particles (A) include a constitutional unit derived from an unsaturated carboxylic acid, adsorption to an active material and/or an inorganic solid electrolyte is improved. Therefore, the dispersion stability of the binder composition for an all-solid state secondary battery according to the embodiment of the present invention is improved.

Specific examples of the unsaturated carboxylic acid include a monocarboxylic or dicarboxylic acid (anhydride) such as acrylic acid, methacrylic acid, crotonic acid, maleic acid, fumaric acid, or itaconic acid. Among these, acrylic acid, methacrylic acid, or itaconic acid is preferable.

In the unsaturated carboxylic acid, an unsaturated group and carboxylic acid may be linked to each other through an appropriate linking group. Examples of the unsaturated carboxylic acid include mono(2-acryloyloxyethyl) succinate and mono(2-methacryloyloxyethyl) succinate.

The content ratio of the repeating unit derived from an unsaturated carboxylic acid to the polymer particles (A) is preferably 15 mass % or lower and more preferably 0.3 to 10 mass %.

4. Conjugated Diene Compound

In a case where the polymer particles (A) include a constitutional unit derived from a conjugated diene compound, a binder composition for an all-solid state secondary battery capable of providing an electrode having excellent viscoelasticity and a high strength can be obtained. That is, in a case where the polymer particles (A) include a constitutional unit derived from a conjugated diene compound, polymer particle having a low glass transition temperature (Tg) but having a crosslinked structure can be obtained. Therefore, the polymer particles easily function as a binder having a good balance between elongation and strength, and thus adhesiveness with the current collector can be further improved.

Examples of the conjugated diene compound include 1,3-butadiene, 2-methyl-1,3-butadiene, 2,3-dimethyl-1,3-butadiene, and 2-chloro-1,3-butadiene. Among these, 1,3-butadiene is preferable.

The content ratio of the constitutional unit derived from the conjugated diene compound to the polymer particles (A) is preferably 35 mass % or lower and more preferably 25 mass % or lower.

5. Aromatic Vinyl Compound

In a case where the polymer particles (A) include a constitutional unit derived from an aromatic vinyl compound and a slurry for an electrode that is prepared using the binder composition for an all-solid state secondary battery according to the embodiment of the present invention includes a conductive auxiliary agent, affinity to the slurry can be further improved.

Specific examples of the aromatic vinyl compound include styrene, α-methylstyrene, p-methylstyrene, vinyl toluene, chlorstyrene, and divinylbenzene. Among these, styrene is preferable.

The content ratio of the constitutional unit derived from the aromatic vinyl compound to the polymer particles (A) is preferably 35 mass % or lower and more preferably 25 mass % or lower.

6. Fluorine-Containing Monomer

In a case where the polymer particles (A) include a constitutional unit derived from a fluorine-containing monomer, the ion conductivity of an electrode active material layer formed of a slurry for an electrode that is prepared using the hinder composition for an all-solid state secondary battery according to the embodiment of the present invention can be further improved.

Specific examples of the fluorine-containing monomer include a fluorinated vinyl compound such as vinylidene fluoride, tetrafluoroethylene, hexafluoropropylene, or hexafluoroisoprene and a fluorinated (meth)acrylate such as 2,2,2-trifluoroethyl methacrylate or 1,1,1,3,3,3-hexafluoroisopropyl methacrylate. Among these, 1,1,1,3,3,3-hexafluorolsopropyl methacrylate is preferable.

The content ratio of the constitutional unit derived from the fluorine-containing monomer to the polymer particles (A) is preferably 35 mass % or lower and more preferably 25 mass % or lower.

7. Macromonomer

The graft portion (branched chain with respect to the main chain) of the graft polymer used in the present invention can be obtained by polymerization (or bonding) of macromonomers that are prepared by polymerization of one or more of the above-described monomers using an ordinary method. The structure of the graft portion is not particularly limited, and examples thereof include a copolymer of vinyl monomers, polyalkylene ether, polyester, polycarbonate, and silicone.

The graft portion can be obtained by polymerization of a (meth)acrylic acid ester that has an alkyl group having 4 to 30 carbon atoms. The number of carbon atoms is preferably 6 to 18 and more preferably 8 to 12. Within this range, the polymer particles (A) can obtain excellent dispersion stability.

In the present invention, as the macromonomer, a commercially available product can also be used. Examples of the commercially available product include methacryl single end type reactive modified silicone series (X-22-174AX, X-22-174VX, KF-2012, X-22-2426, or X-22-2475; trade names, all of which are manufactured by Shin-Etsu Chemical Co., Ltd.).

The glass transition temperature of the graft, portion of the graft polymer used in the present invention is preferably 0° C. or lower, more preferably −110° C. or lower, and still more preferably −20° C. or lower. The lower limit is preferably −80° C. or higher, more preferably −60° C. or higher, and still more preferably −50° C. or higher.

In the present specification, the glass transition temperature of the graft portion of the graft polymer is measured using a dried sample of a macromonomer with a differential scanning calorimeter "X-DSC7000" (trade name, manufactured by SII NanoTechnology Inc.) under the following conditions. The measurement is performed twice using the same sample, and the result of the second measurement is adopted.

Atmosphere in measuring chamber: nitrogen (50 mL/min)
Temperature increase rate: 5° C./min
Measurement start temperature: −100° C.
Measurement end temperature: 200° C.
Sample pan: aluminum pan
Mass of measurement sample: 5 mg Calculation of Tg: Tg is calculated by rounding off the decimal point of an intermediate temperature between a declination start point and a declination end point in a DSC chart.

The SP value of the macromonomer is preferably 10 or lower and more preferably 9.5 or lower. The lower limit value is not particularly limited, but is practically 5 or more.

Definition of SP Value

Unless specified otherwise, the SP value in the present specification is obtained using a Hoy method (H. L. Hoy Journal of Painting, 1970, Vol. 42, 76-118). In addition, the unit of the SP value is not shown but is $cal^{1/2} cm^{-3/2}$. The SP value of the graft portion of the graft polymer is not substantially different from the SP value of the macromonomer and may be evaluated using the SP value of the macromonomer.

The SP value is an index indicating a property of being dispersed in an organic solvent. In addition, it is preferable that the graft portion has a specific molecular weight or higher to adjust the SP value to be in the above-described range because binding properties with the inorganic solid electrolyte can be improved, affinity to the dispersion medium can be improved, and thus solid particles can be stably dispersed.

The mass average molecular weight of the macromonomer is not particularly limited and is preferably 1000 to 100000, more preferably 1000 to 50000, and still more preferably 1000 to 30000.

Measurement of Molecular Weight

In the present invention, unless specified otherwise, the molecular weights of the graft polymer and the macromonomer refer to mass average molecular weights and are obtained by measuring the mass average molecular weights in terms of standard polystyrene by gel permeation chromatography (GPC). Regarding a measurement method, basically, a value measured using a method under the following conditions A or conditions B (preferred) is used. An appropriate eluent may be appropriately selected and used depending on the kinds of the graft polymer and the macromonomer.

Conditions A

Column: Two TOSOH TSKgel Super AWM-H's (trade name) connected together
Carrier: 10 mM LiBr/N-methylpyrrolidone
Measurement temperature: 40° C.
Carrier flow rate: 1.0 mL/min
Sample concentration: 0.1 mass %
Detector: refractive index (RI) detector (Conditions B) Preferred Column: A column obtained by connecting TOSOH TSKgel Super HZM-H (trade name), TOSOH TSKgel Super HZ4000 (trade name), and TOSOH TSKgel Super HZ2000 (trade name)
Carrier: tetrahydrofuran
Measurement temperature: 40° C.
Carrier flow rate: 1.0 mL/min
Sample concentration: 0.1 mass %
Detector: refractive index (RI) detector The macromonomer used in the present invention is preferably a macromonomer including 30 to 100 mass % of the constituent element derived from the (meth)acrylic acid ester, 0 to 30 mass % of the constituent element derived from the conjugated diene, 0 to 20 mass % of the constituent element derived from the aromatic vinyl, and 0 to 20 mass % of the constituent element derived from the unsaturated carboxylic acid. The number of carbon atoms in the ester portion of (meth)acrylic acid ester included in the macromonomer is preferably 4 to 18 and more preferably 6 to 12. Examples of a functional group that imparts reactivity (binding properties or polymerizability with the main chain) to the macromonomer include a meth(acryl) group, a hydroxy group, an epoxy group, a carboxy group, and an alkoxysilyl group.

8. Other Copolymerizable Monomers

Specific examples of other copolymerizable monomers from which the constitutional unit in the polymer particles (A) is derived include an alkyl amide of an ethylenically unsaturated carboxylic acid such as (meth)acrylamide or N-methylol acrylamide, a carboxylic acid vinyl ester such as vinyl acetate or vinyl propionate, an acid anhydride of an unsaturated dicarboxylic acid, a monoalkyl ester of an unsaturated dicarboxylic acid, a monoamide of an unsaturated dicarboxylic acid, and an aminoalkylamide of an unsaturated carboxylic acid such as aminoethyl acrylamide, dimethylaminomethyl methacrylamide, methylaminopropyl methacrylamide, (for example, N-(3-dimethylaminopropyl) methacrylamide).

It is preferable that the polymer particles (A) used in the present invention include 49 to 94 mass % of the repeating unit derived from the (meth)acrylic acid ester, 5 to 50 mass % of the constituent element derived from the macromonomer, 1 to 30 mass % of the constituent element derived from the unsaturated carboxylic acid, 0 to 30 mass % of the constituent element derived from the aromatic vinyl, 0 to 20 mass % of the constituent element derived from the α,β-unsaturated nitrile, 0 to 30 mass % of the constituent element derived from the conjugated diene compound, and 0 to 30 mass % of the constituent element derived from the fluorine-containing monomer.

In the present invention, it is preferable that the polymer particles (A) have at least one in the following group of functional groups. It is preferable that the functional group has a main chain other than the graft portion.

Group of Functional Groups a hydroxy group, a carboxy group or a salt thereof, a sulfonate group (sulfo group: $-SO_3H$) or a salt thereof, a phosphate group (phospho group: $-OPO(OH)_2$) or a salt thereof, a cyano group, and an amino group or a salt thereof The above-described functional group has a function of interacting with solid particles of the inorganic solid electrolyte and/or the active material to make the particles and the polymer particles (A) adsorb each other. The interaction is not particularly limited, and examples thereof include an interaction by a hydrogen bond, an interaction by an acid-base ionic bond, and an interaction by a covalent bond. The solid particles and the polymer particles (A) adsorb each other due to one or two or more among the above-described interactions depending on the kind of the functional group and the kind of the above-described particles.

In a case where the functional group interacts, as described above, the chemical structure of the functional group may or may not change. For example, in the interaction by a covalent bond or the like, typically, the functional group is converted into an anion (the functional group changes) by desorption of active hydrogen such as a carboxylate group and is bonded to the inorganic solid electrolyte.

Dynamic Light Scattering Particle Size Distribution of Polymer Particles (A)

The polymer particles (A) used in the present invention show two or more peaks in a cumulative particle size distribution measured by a dynamic light scattering particle size distribution analyzer. Here, unless specified otherwise, "peak" refers to a value that can be separated as a peak under conditions of a nonlinear least-squares method (number of times of repetition: 100 times, accuracy: 0.000001, tolerance: 5%, convergence: 0.0001).

Unless specified otherwise, in the present invention, the average particle size of the polymer particles (A) refers to a value measured under conditions described below in Examples.

In a case where polymer particles having a minimum peak are represented by "polymer particles (Aa)" and polymer particles having a maximum peak are represented by "polymer particles (Ab)", the total content of the polymer particles (Aa) and the polymer particles (Ab) is preferably 50 mass % or higher and more preferably 80 mass % or higher and may be 100 mass % with respect to the total mass of the polymer particles (A). A ratio "the mass of the polymer particles (Aa):the mass of the polymer particles (Ab)" between the mass of the polymer particles (Aa) and the mass of the polymer particles (Ab) is preferably 1:0.5 to 50, more preferably 1:1 to 20, and still more preferably 1:2 to 10.

It is preferable that the above-described polymer particles (A) are formed of two or more kinds of particles including the polymer particles (Aa) and the polymer particles (Ab). The number of kinds of the particles is not particularly limited, and the number of the above-described peaks is practically five or less. The identification as a group of particles is evaluated according to the definition of the above-described peak, and in a case where the above-described peak is exhibited, the above-described peak is positioned as one particle group.

An average particle size da of the polymer particles (Aa) alone is preferably 0.2 μm or less, more preferably less than 0.2 μm, still more preferably 0.15 μm or less, and still more preferably 0.12 μm or less. The lower limit is preferably 0.01 μm or more, more preferably 0.02 μm or more, and still more preferably 0.03 μm or more.

A cumulative 90% particle size of the polymer particles (Aa) alone is preferably less than 1 μm, more preferably 0.8 μm or less, and still more preferably 0.7 μm or less. The lower limit is preferably 0.2 μm or more and more preferably 0.25 μm or more.

By adjusting the range of the particle size to be in the above-described range, a uniform thin film can be easily formed. Within the above-described range, significant problems in manufacturing can be avoided, the number of particles can be appropriately maintained, and resistance derived from particle interfaces can be suppressed without a significant increase in the total area of the particle interfaces such that excellent ion conductivity can be realized. The range of the average particle size of the above-described polymer particles (Aa) is the same as a range where the peak (Pa) of the minimum particle size in the composition after mixing and the cumulative 90% particle size peak (Pa90) thereof are present.

An average particle size of the polymer particles (Ab) alone is preferably 1 μm or less, more preferably 0.8 μm or less, and still more preferably 0.6 μm or less. The lower limit is preferably 0.2 μm or more, more preferably 0.25 μm or more, and still more preferably 0.3 μm or more.

A cumulative 90% particle size of the polymer particles (Ab) alone is preferably 2 μm or less, more preferably 1 μm or less, and still more preferably 0.8 μm or less. The lower limit is preferably 0.22 μm or more, more preferably 0.25 μm or more, and still more preferably 0.3 μm or more.

In a case where the range of the particle size is in the above-described range, an effect obtained by using particles having different particle sizes is sufficiently exhibited, which is preferable. In a case where the range of the particle size is the above-described lower limit value or higher, the manufacturing suitability is excellent, the number of particle size does not increase, the total area of particle interfaces does not increase significantly, and the resistance derived from the particle interfaces can be suppressed such that excellent ion conductivity can be realized, which is preferable. The range of the average particle size of the above-described polymer particles (Ab) is the same as a range where the peak (Pb) of the maximum particle size in the composition after mixing and the cumulative 90% particle size peak (Pb90) thereof are present.

It is preferable that the average particle size da of the polymer particles (Aa) and the average particle size db of the polymer particles (Ab) satisfy a relationship of db>da. A difference (db−da) between the average particle sizes is preferably 0.1 or more, more preferably 0.2 or more, and still more preferably 0.3 or more. The upper limit is preferably 1.5 or less, more preferably 1 or less, and still more preferably 0.8 or less. By adjusting this difference to be in the suitable range, two different kinds of particles are likely to be more densely filled, and the ion conductivity is improved, which is preferable.

In a case where the relationship between the polymer particles (Aa) and the polymer particles (Ab) is defined in a solid electrolyte composition as a product, the relationship is as follows. That is, the relationship between the peak (Pa) of the maximum particle size and the peak (Pb) of the minimum particle size in the polymer particles satisfies preferably the following Expression (1), more preferably the following Expression (1a), and still more preferably the following Expression (1b).

$$0.05 \leq Pa/Pb \leq 0.75 \tag{1}$$

$$0.1 \leq Pa/Pb \leq 0.72 \tag{1a}$$

$$0.25 \leq Pa/Pb \leq 0.70 \tag{1b}$$

From the viewpoint of raw material particles obtained by mixing the above-described the different kinds of particles, the relationship between the average particle size db of the polymer particles (Ab) and the average particle size da of the polymer particle (Aa) satisfies preferably the following Expression (2), more preferably the following Expression (2a), and still more preferably the following Expression (2b).

$$0.05 \leq da/db \leq 0.75 \tag{2}$$

$$0.1 \leq da/db \leq 0.72 \tag{2a}$$

$$0.25 \leq da/db \leq 0.70 \tag{2b}$$

By adjusting the relationship between the particle size of the polymer particles (Aa) and the particle size of the polymer particles (Ab), voids generated by mixing the two different kinds of particles and densely filling (pressure forming) the mixture are effectively reduced, which is preferable. As a result, the resistance derived from interfaces in the solid electrolyte layer can b effectively suppressed, and excellent ion conductivity can be exhibited.

Non-Aqueous Dispersion Medium (B)

The binder composition for an all-solid state secondary battery according to the embodiment of the present invention includes the non-aqueous dispersion medium (B) for dispersing the solid components. The non-aqueous dispersion medium (B) is not particularly limited as long as it disperses the solid components, and examples thereof include various organic solvents. Specific examples of the non-aqueous dispersion medium (B) are as follows.

Examples of an alcohol compound solvent include methyl alcohol, ethyl alcohol, 1-propyl alcohol, 2-butanol, ethylene glycol, propylene glycol, glycerin, 1,6-hexanediol, 1,3-butanediol, and 1,4-butanediol.

Examples of the ether compound solvent include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol dimethyl ether, dipropylene glycol monomethyl ether, tripropylene glycol monomethyl ether, diethylene glycol monobutyl ether, or diethylene glycol dibutyl ether, tetraethylene glycol dimethyl ether (tetraglyme), triethylene glycol dimethyl ether (triglyme), tetraethylene glycol monomethyl ether, triethylene glycol monomethyl ether, tetraethylene glycol, or triethylene glycol), dialkyl ether (for example, dimethyl ether, diethyl ether, or dibutyl ether), tetrahydrofuran, and dioxane (including respective isomers of 1,2-, 1,3, and 1,4-).

Examples of an amide compound solvent include N,N-dimethylformamide, 1-methyl-2-pyrrolidone, 1,3-dimethyl-2-imidazolidinone, 2-pyrrolidinone, ε-caprolactam, formamide, N-methylformamide, acetamide, N-methylacetamide, N,N-dimethylacetamide, N-methylpropanamide, and hexamethylphosphorictriamide.

Examples of an amino compound solvent include triethylamine, and tributylamine.

Examples of a ketone compound solvent include acetone, methyl ethyl ketone, diethyl ketone, dipropyl ketone, dibutyl ketone, and diisobutyl ketone.

Examples of an ester compound solvent include methyl acetate, ethyl acetate, propyl acetate, 2-(1-methoxy)propyl acetate, butyl acetate, pentyl acetate, hexyl acetate, methyl propionate, ethyl propionate, propyl propionate, butyl propionate, methyl butyrate, ethyl butyrate, propyl butyrate, butyl butyrate, pentyl butyrate, methyl isobutyrate, ethyl isobutyrate, propyl isobutyrate, isopropyl isobutyrate, isobutyl isobutyrate, methyl valerate, ethyl valerate, propyl valerate, butyl valerate, methyl caproate, ethyl caproate, propyl caproate, and butyl caproate.

Examples of an aromatic compound solvent include benzene, toluene, ethylbenzene, xylene, and mesitylene.

Examples of an aliphatic compound solvent include hexane, heptane, octane, nonane, decane, pentane, cyclopentane, decaline, and isoprene. The aliphatic compound solvent may have a halogen atom (for example, a fluorine atom, a chlorine atom, a bromine atom, or an iodine atom), and examples of the aliphatic compound solvent having a halogen atom include hexafluoroisoprene.

Examples of a nitrile compound solvent include acetonitrile, propionitrile, and butyronitrile.

The boiling point of the non-aqueous dispersion medium (B) under normal pressure (1 atm) is preferably 50° C. or higher and more preferably 70° C. or higher. The upper limit is more preferably 250° C. or lower and still more preferably 220° C. or lower.

As the non-aqueous dispersion medium (B), one kind may be used alone, or two or more kinds may be used in combination.

In the present invention, from the viewpoint of high stability to the inorganic solid electrolyte, at least one of a hydrocarbon compound solvent (an aromatic compound solvent or an aliphatic compound solvent), a ketone compound solvent, an ether compound solvent, an ester compound solvent, or a nitrile compound solvent is preferably used, and at least one of a hydrocarbon compound solvent, a ketone compound solvent, or an ester compound solvent is more preferably used.

The content of the non-aqueous dispersion medium (B) in the hinder composition for an all-solid state secondary battery is preferably 20 to 80 mass %, more preferably 30 to 70 mass %, and still more preferably 40 to 60 mass %.

In order for the binder composition for an all-solid state secondary battery according to the embodiment of the present invention to include the polymer particles (A) in a state where the shape of the particles is retained, the lower limit value of the content of the hydrocarbon solvent in the non-aqueous dispersion medium (B) is preferably 50 mass % or higher, more preferably 70 mass % or higher, and still more preferably 90 mass % or higher. The upper limit value is not particularly limited and is preferably 100 mass %.

The moisture content of the non-aqueous dispersion medium (B) is preferably 100 ppm or lower, more preferably 50 ppm or lower, and still more preferably 10 ppm or lower.

The dissolved oxygen of the non-aqueous dispersion medium (B) is preferably 100 ppm or lower, more preferably 50 ppm or lower, and still more preferably 10 ppm or lower.

Inorganic Solid Electrolyte (C) Having Ion Conductivity of Metal Belonging to Group 1 or Group 2 in Periodic Table The hinder composition for an all-solid state secondary battery according to the embodiment of the present invention may include an inorganic solid electrolyte (C) having ion conductivity of a metal belonging to Group 1 or Group 2 in the periodic table. Hereinafter, the binder composition for an all-solid state secondary battery including the inorganic solid electrolyte (C) having ion conductivity of a metal belonging to Group 1 or Group 2 in the periodic table will also be referred to as "solid electrolyte composition".

The inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic substance as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, LiFSI, LiCl, and the like). The inorganic solid electrolyte is not particularly limited as long as it has ion conductivity of a metal belonging to Group 1 or Group 2 in the periodic table and generally does not have electron conductivity. Hereinafter, "the inorganic solid electrolyte (C) having ion conductivity of a metal belonging to Group 1 or Group 2 in the periodic table" will also be simply referred to as "inorganic solid electrolyte (C)" or "inorganic solid electrolyte".

In the present invention, the inorganic solid electrolyte has ion conductivity of a metal belonging to Group 1 or Group 2 in the periodic table. The inorganic solid electrolyte can be appropriately selected from solid electrolyte materials to be applied to this kind of products and used. Representative examples of the inorganic solid electrolyte include (i) a sulfide-based inorganic solid electrolyte and (ii) an oxide-based inorganic solid electrolyte. In the present invention, a more favorable interface can be formed between the active material and the inorganic solid electrolyte. Therefore, a sulfide-based inorganic solid electrolyte is preferably used.

(i) Sulfide-Based Inorganic Solid Electrolyte

The sulfide-based inorganic solid electrolyte is preferably a compound that contains a sulfur atom (S), has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. However, the sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by the following Formula (I).

$$L_{a1}M_{b1}P_{c1}S_{d1}A_{e1} \quad \text{Formula,(I)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios among the respective elements, and a1:b1:c1:d1:e1 satisfies 1 to 12:0 to 5:1:2 to 12:0 to 10. Further, a1 is preferably 1 to 9 and more preferably 1.5 to 7.5. b1 is preferably 0 to 3 and more preferably 0 to 1. Further, d1 is preferably 2.5 to 10 and more preferably 3.0 to 8.5. Further, e1 is preferably 0 to 5 and more preferably 0 to 3.

The compositional ratios among the respective elements can be controlled by adjusting the ratios of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphoruspentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$—LiCl, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a inciting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom (O), has ion conductivity of a metal belonging to Group 1 or Group 2 in the periodic table, and has electron-insulating properties.

Specific examples of the compound include $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}_{zc}O_{nc}$ ($M^{cc}$ is at least one element of C, S, Al, Si, Ga, Ge, In, or Sn, xc satisfies 0≤xc≤5, ye satisfies 0≤yc≤1, zc satisfies 0≤zc ≤1, and nc satisfies 0≤nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}_{xe}D^{ee}O$ (xe represents a number of 0 or more and 0.1 or less, and $M^{cc}$ represents a divalent metal atom. $D^{cc}$ represents a halogen atom or a combination of two or more halogen atoms.), $Li_xSi_yO_z$(1≤xf≤5, 0<yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovse lithium phosphate ($Li_3PO_4$) and UPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like). It is also possible to preferably use $LiA^1ON$ ($A^1$ represents at least one element selected from Si, B, Ge, Al C, Ga, or the like) and the like.

The volume average particle size of the inorganic solid electrolyte is not particularly limited, but is preferably 0.01 μm or more and more preferably 0.1 μm or more. The upper limit is preferably 100 μm or less and more preferably 50 μm or less. The average particle size of the inorganic solid electrolyte particles is measured in the following order. The inorganic solid electrolyte particles are diluted and adjusted to 1 mass % of a dispersion liquid by using water (heptane in a case where the inorganic solid electrolyte is unstable in water) in a 20 ml sample bottle. The diluted dispersion specimen is irradiated with 1 kHz ultrasonic waves for 10 minutes and is then immediately used for testing. The volume average particle size is obtained by acquiring data 50 times using this dispersion liquid specimen, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five samples are prepared and the average value thereof is adopted.

From the viewpoints of reducing the interface resistance during use in the all-solid state secondary battery and maintaining the reduced interface resistance, the content of the inorganic solid electrolyte in the solid electrolyte composition is preferably 5 mass % or higher, more preferably 10 mass % or higher, and particularly preferably 20 mass % or higher with respect to 100 mass % of the solid components. From the same viewpoint, the upper limit is preferably 99.9 mass % or lower, more preferably 99.5 mass % or lower, and particularly preferably 99 mass % or lower.

As the inorganic solid electrolyte, one kind may be used alone, or two or more kinds may be used in combination.

Here, in a case where the solid electrolyte composition contains an active material described below, regarding the content of the inorganic solid electrolyte in the solid electrolyte composition, the total content of the active material and the inorganic solid electrolyte is preferably in the above-described range.

In the present specification, the solid content (solid components) refers to components that neither volatilize nor evaporate and disappear in a case where drying is performed at 170° C. for 6 hours in a nitrogen atmosphere. Typically, the solid content refers to components other than the above-described non-aqueous dispersion medium.

Active Material (D)

The solid electrolyte composition according to the embodiment of the present invention may also include the active material (D) capable of intercalating and deintercalating ions of a metal element belonging to Group 1 or Group 2 in the periodic table. Hereinafter, "the active material (D) capable of intercalating and deintercalating ions of a metal belonging to Group 1 or Group 2 in the periodic table" will also be simply referred to as "active material (D)" or "active material.

Examples of the active material include a positive electrode active material and a negative electrode active material. In particular, a metal oxide (preferably a transition metal oxide) that is the positive electrode active material, a metal oxide that is the negative electrode active material, or metal such as Sn, Si, Al, or In capable of forming an alloy with lithium is preferable.

In the present invention, the solid electrolyte composition including the active material (the positive electrode active material or the negative electrode active material) will be referred to as an electrode composition (a positive electrode composition or a negative electrode composition).

Positive Electrode Active Material

A positive electrode active material that may be included in the solid electrolyte composition of the embodiment of the present invention is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as rel, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (circle-equivalent average particle size) of positive electrode active material particles is not particularly limited. For example, the volume average particle diameter can be set to 0.1 to 50 μm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (circle-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

In the case of forming a positive electrode active material layer, the mass (mg) of the positive electrode active material per unit area ($cm^2$) of the positive electrode active material layer (weight per unit area) is not particularly limited and can be appropriately determined depending on the designed battery capacity.

The content of the positive electrode active material in the solid electrolyte composition is not particularly limited, but is preferably 10% to 95 mass %, more preferably 30% to 90 mass %, still more preferably 50% to 85 mass %, and particularly preferably 55% to 80 mass % with respect to a solid content of 100 mass %.

Negative Electrode Active Material

A negative electrode active material that may be included in the solid electrolyte composition of the embodiment of the present invention is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal composite oxides, a lithium single body, lithium alloys such as lithium aluminum alloys, metals capable of forming alloys with lithium such as Sn, Si, Al, and In and the like. Among these, carbonaceous materials or a lithium single body is preferable. In addition, the metal composite oxides are preferably capable of intercalating and deintercalating lithium. The materials are not particularly limited, but preferably include titanium and/or lithium as constituent components from the viewpoint of high current density charging-discharging characteristics.

The carbonaceous material which is used as the negative electrode active material is a material substantially containing carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ when measured by an X-ray diffraction method using CuKα rays, and the oxide may have a crystal diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Si, Sn, Ge, Pb, Sb, and B$i$, and chalcogenides are particularly preferable. Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be composite oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the intercalation and deintercalation of lithium ions is small, and thus the high-speed charging-discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of intercalating a larger number of Li ions than a carbon negative electrode (graphite, acetylene black, or the like). That is, the amount of Li ions intercalated per unit mass increases. Therefore, it is possible to increase the battery capacity. As a result, there is an advantage that the battery driving duration can be extended.

The shape of the negative electrode active material is not particularly limited, but is preferably a particle shape. The average particle size of the negative electrode active material is preferably 0.1 to 60 μm. In order to obtain a predetermined particle size, an ordinary pulverizer or classifier is used. For example, a mortar, a ball mill, a sand mill, an oscillatory ball mill, a satellite ball mill, a planetary ball mill, a swirling airflow-type jet mill, a sieve, or the like is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

The chemical formulae of the compounds obtained using a calcination method can be computed using inductively coupled plasma (ICP) optical emission spectroscopy as a measurement method from the mass difference of powder before and after calcinating as a convenient method.

As the negative electrode active material, one kind may be used alone, or two or more kinds may be used in combination.

In the case of forming a negative electrode active material layer, the mass (mg) of the negative electrode active material per unit area ($cm^2$) in the negative electrode active material layer (weight per unit area) is not particularly limited and can be appropriately determined depending on the designed battery capacity.

The content of the negative electrode active material in the solid electrolyte composition is not particularly limited, but is preferably 10 to 80 mass % and more preferably 20% to 80 mass % with respect to the solid content of 100 mass %.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinet, tantalum-based oxides, niobium-based oxides, lithium and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an actinic ray or an active gas (plasma or the like) before or after the coating of the surfaces.

Dispersant

The solid electrolyte composition according to the embodiment of the present invention may include a dispersant. In a case where the content of any one of the electrode active material or the inorganic solid electrolyte is high and/or in a case where the particle size of the electrode active material and the inorganic solid electrolyte is small such that the surface area increases, by adding the dispersant, the aggregation thereof can be suppressed, and the active material layer and the solid electrolyte layer can be uniformly formed. As the dispersant, a dispersant that is generally used for an all-solid state secondary battery can be appropriately selected and used. Generally, a compound intended for particle adsorption and steric repulsion and/or electrostatic repulsion is preferably used.

Lithium Salt

The solid electrolyte composition according to the embodiment of the present invention may include a lithium salt.

The lithium salt is not particularly limited, and, for example, a lithium salt described in paragraphs "0082" to "0085" of JP2015-088486A is preferable.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

Ionic Liquid

In order to further improve the ion conductivity of each of layers forming a solid electrolyte-containing sheet or an all-solid state secondary battery, the solid electrolyte composition according to the embodiment of the present invention may include an ionic liquid. The ionic liquid is not particularly limited, but is preferably an ionic liquid dissolving the above-described lithium salt from the viewpoint of effectively improving the ion conductivity. Examples thereof include compounds made of a combination of a cation and an anion described below.

(i) Cation

Examples of the cation include an imidazolium cation, a pyridinium cation, a piperidinium cation, a pyrrolidinium cation, a morpholinium cation, a phosphonium cation, and a quaternary ammonium cation. Here, these cations have a substituent described below.

As the cation, one kind may be used alone, or two or more kinds may be used in combination.

A quaternary ammonium cation, a piperidinium cation, or a pyrrolidinium cation is preferable.

Examples of the substituent that may be included in the above-described cation include an alkyl group (preferably having 1 to 8 carbon atoms and more preferably having 1 to 4 carbon atoms), a hydroxyalkyl group (preferably having 1 to 3 carbon atoms), an alkyloxyalkyl group (an alkyloxyalkyl group having 2 to 8 carbon atoms is preferable, and an alkyloxyalkyl group having 2 to 4 carbon atoms is more preferable), an ether group, an allyl group, an aminoalkyl group (an aminoalkyl group having 1 to 8 carbon atoms is preferable, and an aminoalkyl group having 1 to 4 carbon atoms is more preferable), and an aryl group (an aryl group having 6 to 12 carbon atoms is preferable, and an aryl group having 6 to 8 carbon atoms is more preferable). The substituent may form a cyclic structure in a form of containing a cation site. The substituent may further have a substituent. The ether group can be used in combination with other substituents. Examples of the substituent include an alkyloxy group and an aryloxy group.

(ii) Anion

Examples of the anion include a chloride ion, a bromide ion, an iodide ion, a boron tetrafluoride ion, a nitric acid ion, a dicyanamide ion, an acetate ion, an iron tetrachloride ion, a bis(trifluoromethanesulfonyl)imide ion, a bis(fluorosulfonyl)imide ion, a bis(perfluorobutylmethanesulfonyl)imide ion, an allylsulfonate ion, a hexafluorophosphate and a trifluoromethanesulfonate ion.

As the anion, one kind may be used alone, or two or more kinds may be used in combination.

A boron tetrafluoride ion, a bis(trifluoromethanesulfonyl)imide ion, a bis(fluorosulfonyl)imide ion, a hexafluorophosphate ion, a dicyanamide ion, or an allylsulfonate ion is preferable, and a bis(trifluoromethanesulfonyl)imide ion, a bis(fluorosulfonyl)imide ion, or an allylsulfonate ion is more preferable.

Examples of the ionic liquid include 1-allyl-3-ethylimidazolium bromide, 1-ethyl-3-methylimidazolium bromide, 1-(2-hydroxyethyl)-3-methylimidazolium bromide, 1-(2-methoxyethyl)-3-methylimidazolium bromide, 1-octyl-3-methylimidazolium chloride, N,N-diethyl-N-methyl-N-(2-methoxyethyl)ammonium tetrafluoroborate, 1-ethyl-3-methylimidazolium bis(trifluoromethanesulfonyeimide, 1-ethyl-3-methylimidazolium bis(fluorosulfonyl)imide, 1-ethyl-3-methylimidazolium dicyanamide, 1-butyl4-methylpyrrolidinium bis(trifluoromethanesulfonyl)imide, trimethylbutylammoniumbis(tritluoromethanesulfonyl)imide, N,N-diethyl-N-methyl-N-(2-methoxyethyl) ammonium bis(trifluoromethanesulfonyl)imide (DEME), N-propyl-N-methylpyrrolidiniumbis(trifluoromethanesulfonyl)imide (PMP), N-(2-methoxyethyl)-N-methylpyrrolidiniumtetrafluoroboride, 1-butyl-1-methylpyrrolidinium bis(fluorosulfonyl)imide, (2-acryloylethyl) trimethylammoniumbis(trifluoromethanesulthnyl)imide, 1-ethyl-1-methylpyrrolidinium allyl sulfonate, 1-ethyl-3-methylimidazolium allylsulfonate, and trihexyltetradecylphosphonium chloride.

The content of the ionic liquid is preferably 0 parts by mass or more, more preferably 1 part by mass or more, and most preferably 2 parts by mass or more with respect to 100 parts by mass of the inorganic solid electrolyte The upper limit is preferably 50 parts by mass or less, more preferably 20 parts by mass or less, and particularly preferably 10 parts by mass or less.

The mass ratio between the lithium salt and the ionic liquid (the lithium salt:the ionic liquid) is preferably 1:20 to 20:1, more preferably 1:10 to 10:1, and most preferably 1:7 to 2:1.

Conductive Auxiliary Agent

The solid electrolyte composition according to the embodiment of the present invention may include a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

Preparation of Binder Composition for All-Solid State Secondary Battery

The hinder composition for an all-solid state secondary battery according to the embodiment of the present invention can be prepared by dispersing the polymer particles (A) in the presence of the non-aqueous dispersion medium (B) to form a slurry.

The slurry can be formed by mixing the polymer particles (A) and the non-aqueous dispersion medium (B) using various mixing devices. The mixing device is not particularly limited, and examples thereof include a ball mill, a beads mill, a planetary mixer, a blade mixer, a roll mill, a kneader, and a disc mill. The mixing conditions are not particularly limited. However, in a case where a ball mill is used, the inorganic solid electrolyte and the dispersion medium are preferably mixed together at 150 to 700 rpm (rotation per minute) for 1 to 24 hours.

In order to prepare the solid electrolyte composition including components such as the inorganic solid electrolyte (C) and the active material (D), the components may be added and mixed together or separately with the step of dispersing the polymer particles (A).

Sheet for All-Solid State Secondary Battery

A solid electrolyte-containing sheet according to the embodiment of the present invention can be suitably used in an all-solid state secondary battery and includes various aspects depending on the uses. Examples thereof include a sheet that is preferably used in a solid electrolyte layer (also referred to as a solid electrolyte sheet for an all-solid state secondary battery), and a sheet that is preferably used in an electrode or a laminate of an electrode and a solid electrolyte layer (an electrode sheet for an all-solid state secondary battery). in the present invention, these various sheets will also be collectively referred to as a sheet for an all-solid state secondary battery.

The sheet for an all-solid state secondary battery is a sheet including the solid electrolyte layer or the active material layer (electrode layer). This sheet for an all-solid state secondary battery may further include other layers as long as it includes the solid electrolyte layer or the active material layer, but a sheet including an active material is classified into an electrode sheet for an all-solid state secondary battery described below Examples of the other layers include a protective layer, a current collector, and a coating layer (the current collector, the solid electrolyte layer, and the active material layer).

Examples of the solid electrolyte sheet for an all-solid state secondary battery include a sheet including the solid electrolyte layer and the protective layer on a substrate in this order and a sheet (sheet not including a substrate) formed of the solid electrolyte layer or the active material layer (electrode layer).

The substrate is not particularly limited as long as it can support the solid electrolyte layer or the active material layer, and examples thereof include a sheet body (plate-shaped body) formed of a materials, an organic material, an inorganic material, or the like described below regarding the current collector. Examples of the organic materials include various polymers, and specific examples thereof include polyethylene terephthalate, polypropylene, polyethylene, and cellulose. Examples of the inorganic materials include glass and ceramic.

The thickness of the solid electrolyte layer in the sheet for an all-solid state secondary battery is the same as the thickness of the solid electrolyte layer described below regarding the all-solid state secondary battery according to the embodiment of the present invention.

This sheet is obtained by forming a film (applying and drying) of the solid electrolyte composition according to the embodiment of the present invention to the substrate (other layers may be interposed therebetween) to form the solid electrolyte layer on the substrate. The substrate may be obtained by removing the solid electrolyte layer from the sheet including the solid electrolyte layer.

Here, the solid electrolyte composition according to the embodiment of the present invention can be prepared using the above-described method.

The electrode sheet for an all-solid state secondary battery (also simply referred to as "electrode sheet") according to the embodiment of the present invention is a sheet for forming the active material layer in the all-solid state secondary battery according to the embodiment of the present invention, in which the active material layer is provided on the metal foil as the current collector. The electrode sheet is typically a sheet including the current collector and the active material layer, and examples of an aspect thereof include an aspect including the current collector, the active material layer, and the solid electrolyte layer in this order and an aspect including the current collector, the active material layer, the solid electrolyte layer, and the active material layer in this order.

The thickness of each of the layers forming the electrode sheet is the same as the thickness of each of layers described below regarding the all-solid state secondary battery according to the embodiment of the present invention.

The electrode sheet is obtained by forming a film (applying and drying) of the solid electrolyte composition according to the embodiment of the present invention including the active material to a metal foil to form the active material layer on the metal foil. The method of preparing the solid electrolyte composition including the active material is the same as the method of preparing the above-described solid electrolyte composition, except that the active material is used.

All-Solid State Secondary Battery

The all-solid state secondary battery according to the embodiment of the present invention includes a positive electrode, a negative electrode facing the positive electrode, and a solid electrolyte layer interposed between the positive electrode and the negative electrode. The positive electrode includes the positive electrode active material layer on the positive electrode current collector. The negative electrode includes the negative electrode active material layer on the negative electrode current collector.

At least one of the negative electrode active material layer, the positive electrode active material layer, or the solid electrolyte layer is the solid electrolyte-containing sheet according to the embodiment of the present invention.

In the active material layer and/or the solid electrolyte layer formed of the solid electrolyte composition, the kinds of components to be included and the content ratio thereof are the same as those of the solid content of the solid electrolyte composition.

Hereinafter, an all-solid state secondary battery according to a preferred embodiment of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and have a laminated structure. In a case in which the above-described structure is employed, during charging, electrons (e⁻) are supplied to the negative electrode side, and lithium ions (Li⁺) are stored in the negative electrode side. On the other hand, during discharging, the lithium ions (Li⁺) stored in the negative electrode side return to the positive electrode, and electrons are supplied to an operation portion 6. In an example illustrated in the drawing, an electric bulb is employed as the operation portion 6 and is lit by discharging. The solid electrolyte composition according to the embodiment of the present invention can be preferably used as a material forming the negative electrode active material layer, the positive electrode active material layer, and the solid electrolyte layer. In addition, the solid electrolyte-containing sheet according to the embodiment of the present invention is suitable as the negative electrode active material layer, the positive electrode active material layer, and the solid electrolyte layer.

In the present specification, the positive electrode active material layer (hereinafter, also referred to as the positive electrode layer) and the negative electrode active material layer (hereinafter, also referred to as the negative electrode layer) will also be collectively referred to as the electrode layer or the active material layer.

The thicknesses of the positive electrode active material layer 4, the solid electrolyte layer 3, and the negative electrode active material layer 2 are not particularly limited. In consideration of the dimension of a general battery, the thicknesses are preferably 10 to 1,000 µm and more preferably 20 µm or more and less than 500 µm. In the all-solid state secondary battery according to the embodiment of the present invention, the thickness of at least one layer of the positive electrode active material layer 4, the solid electrolyte layer 3, or the negative electrode active material layer 2 is still more preferably 50 µm or more and less than 500 µm.

Positive Electrode Active Material Layer, Solid Electrolyte Layer, and Negative Electrode Active Material Layer In the all-solid state secondary battery 10, any one of the positive electrode active material layer, the solid electrolyte layer, or the negative electrode active material layer is formed using the solid electrolyte composition according to the embodiment of the present invention.

That is, in a case where the solid electrolyte layer 3 is formed using the solid electrolyte composition according to the embodiment of the present invention, the solid electrolyte layer 3 includes the polymer particles (A) and the inorganic solid electrolyte (C). Typically, the solid electrolyte layer does not include a positive electrode active material and/or a negative electrode active material. It is presumed that, in the solid electrolyte layer 3, the polymer particles (A) are present between the solid particles of the active material and the like included in the inorganic solid electrolyte (C) and the active material layer adjacent thereto. Therefore, the interface resistance between the solid particles is reduced, and binding properties are improved.

In a case where the positive electrode active material layer 4 and/or the negative electrode active material layer 2 is formed using the solid electrolyte composition according to the embodiment of the present invention, the positive electrode active material layer 4 or the negative electrode active material layer 2 includes the positive electrode active material or the negative electrode active material and further includes the polymer particles (A) and the inorganic solid electrolyte (C). In a case where the active material layer includes the inorganic solid electrolyte (C), the ion conductivity can be improved. It is presumed that the polymer particles (A) are present between the solid particles and the like in the active material layer. Therefore, the interface resistance between the solid particles is reduced, and binding properties are improved.

The kinds of the polymer particles (A) and the inorganic solid electrolyte (C) included in the positive electrode active material layer 4, the solid electrolyte layer 3, and the negative electrode active material layer 2 may be the same as or different from each other, respectively.

In the present invention, any one of the negative electrode active material layer, the positive electrode active material layer, or the solid electrolyte layer in the all-solid state secondary battery is prepared using the solid electrolyte composition including the polymer particles (A) and the solid particles such as the inorganic solid electrolyte (C).

Therefore, binding properties between the solid particles can be improved, and thus excellent cycle characteristics of the all-solid state secondary battery can also be realized.

Current Collector (Metal Foil)

The positive electrode current collector 5 and the negative electrode current collector 1 are preferably an electron conductor.

In the present invention, either or both of the positive electrode current collector and the negative electrode current collector will also be simply referred to as the current collector.

As a material forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet-like shape are used, but it is also possible to use net-shaped collectors, punched collectors, compacts of lath bodies, porous bodies, foaming bodies, or fiber groups, and the like.

The thickness of the current collector is not particularly limited, but is preferably 1 to 500 μm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof In addition, each of the layers may have a single-layer structure or a multi-layer structure.

Case

A basic structure of the all-solid state secondary battery can be prepared by disposing the above-described respective layers. Depending on uses, the all-solid state secondary battery according to the embodiment of the present invention may be used as an all-solid state secondary battery as it is but is sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short circuit prevention.

Manufacturing of Solid Electrolyte-Containing Sheet

The solid electrolyte-containing sheet according to the embodiment of the present invention is obtained, for example, by forming a film (applying and drying) of the solid electrolyte composition according to the embodiment of the present invention to the substrate (other layers may be interposed therebetween) to form the solid electrolyte layer or the active material layer (applied and dried layer) on the substrate.

In the above-described aspect, the sheet for an all-solid state secondary battery as the sheet including the substrate and the applied and dried layer can be prepared. Here, the applied and dried layer refers to a layer formed by applying the solid electrolyte composition of the embodiment of the present invention and drying the non-aqueous dispersion medium (that is, a layer formed using the solid electrolyte composition of the embodiment of the present invention and made of a composition obtained by removing a dispersing solvent from the solid electrolyte composition of the embodiment of the present invention).

In addition, in the step of application or the like, a method described below regarding the manufacturing of the all-solid state secondary battery can be used.

The solid electrolyte-containing sheet may include a non-aqueous dispersion medium in each of the layers within a range not affecting the battery performance. Specifically, the content of the non-aqueous dispersion medium may be 1 ppm to 10000 ppm with respect to the total mass of the layers.

Manufacturing of All-Solid State Secondary Battery and Electrode Sheet for All-Solid State Secondary Battery The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers using the solid electrolyte composition according to the embodiment of the present invention and the like. Hereinafter, the details will be described in detail.

The all-solid state secondary battery according to the embodiment of the present invention can be manufactured using a method including (through) a step of applying the solid electrolyte composition according to the embodiment of the present invention to a metal foil as a current collector to form a coating film (to form a film).

For example, the solid electrolyte composition including the positive electrode active material is applied as a positive electrode material (positive electrode composition) to a metal foil which is a positive electrode current collector so as to form a positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Furthermore, the solid electrolyte composition including the negative electrode active material is applied as a negative electrode material (negative electrode composition) to the solid electrolyte layer so as to form a negative electrode active material layer. By laminating the negative electrode current collector (metal foil) on the negative electrode active material layer, an all-solid state secondary battery having a structure in which the solid electrolyte layer is interposed between the positive electrode active material layer and the negative electrode active material layer can be obtained. Optionally by sealing the laminate in a case, a desired all-solid state secondary battery can be obtained.

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, the solid electrolyte composition including the negative electrode active material is applied as a negative electrode material (negative electrode composition) to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are produced as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is interposed therebetween. This way, even in a region where the content of the inorganic solid electrolyte in at least of the positive electrode active material layer or the negative electrode active material layer is low at 10 mass % or lower, adhesiveness between the active material and the inorganic solid electrolyte is improved, an effective ion conduction path can be maintained, and an all-solid state secondary battery having a high energy density (Wh/kg) and a high output density (W/kg) per battery mass can be manufactured.

An all-solid state secondary battery can also be manufactured by combining the above-described forming methods. For example, the positive electrode sheet for an all-solid state secondary battery, the negative electrode sheet for an all-solid state secondary battery, and the solid electrolyte sheet for an all-solid state secondary battery, are prepared respectively. Next, the solid electrolyte layer removed from the substrate is laminated on the negative electrode sheet for an all-solid state secondary battery, and the positive electrode sheet for an all-solid state secondary battery is bonded thereto. As a result, an all-solid state secondary battery can be manufactured. In this method, it is also possible to laminate the solid electrolyte layer on the positive electrode sheet for an all-solid state secondary battery and to bond the solid electrolyte layer to the negative electrode sheet for an all-solid state secondary battery.

Formation of Respective Layers (Film Formation)

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the non-aqueous dispersion medium can be removed to make the composition enter a solid state. In addition, the temperature is not excessively increased, and the respective members of the all-solid state secondary battery are not impaired, which is preferable. Therefore, in the all-solid state secondary battery, excellent total performance can be exhibited, and excellent binding properties can be obtained.

After the application of the solid electrolyte composition or after the preparation of the all-solid state secondary battery, the respective layers or the all-solid state secondary battery is preferably pressurized. In addition, the respective layers are also preferably pressurized in a state where they are laminated. Examples of the pressurization method include a method using a hydraulic cylinder pressing machine. The pressure is not particularly limited, but is, generally, preferably in a range of 50 to 1,500 MPa.

In addition, the applied solid electrolyte composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte.

The pressurization may be carried out in a state in which the coating solvent or the non-aqueous dispersion medium is dried in advance or in a state in which the coating solvent or the non-aqueous dispersion medium remains.

The respective compositions may be applied at the same time, and the application, the drying, and the pressing may be carried out simultaneously and/or sequentially. The respective compositions may be applied to separate substrates and then laminated by transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be uniform or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

Initialization

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

Usages of All-Solid State Secondary Battery

The all-solid state secondary battery according to the embodiment of the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, and memory cards. Additionally, examples of consumer usages include automobiles (electric cars and the like), electric vehicles, motors, lighting equipment, toys, game devices, road conditioners, watches, strobes, cameras, medical devices (pacemakers, hearing aids, and shoulder massage devices, and the like). Furthermore, the all-solid state secondary battery can be used for a variety of military usages and universe usages. In addition, the all-solid state secondary battery can also be combined with solar batteries.

In a preferred embodiment of the present invention, the following respective aspects can be obtained.

[1] An all-solid state secondary battery in which all the positive electrode active material layer, the solid electrolyte layer, and the negative electrode active material layer are formed of the solid electrolyte composition according to the embodiment of the present invention.

[2] A method of manufacturing an all-solid state secondary battery in which the solid electrolyte layer is formed by applying a slurry obtained by dispersing a graft polymer through a wet process to form a film, the graft polymer not including a surfactant and having three or more peaks in a scattering intensity distribution measured by a dynamic light scattering particle size distribution analyzer.

[3] A solid electrolyte composition comprising an active material for preparing the above-described all-solid state secondary battery.

[4] An electrode sheet for an all-solid state battery that is formed by applying the above-described solid electrolyte composition to a metal foil.

[5] A method of manufacturing an electrode sheet for an all-solid state secondary battery in which the above-described solid electrolyte composition is applied to a metal foil to form a film.

The all-solid state secondary battery refers to a secondary battery in which the positive electrode, the negative electrode, and the electrolyte are solid. In other words, the all-solid state secondary battery is distinguished from an electrolyte secondary battery in which a carbonate solvent is used as an electrolytic solution. In particular, the present invention has been made assuming an inorganic all-solid state secondary battery. The all-solid state secondary battery is classified into an organic (polymer) all-solid state secondary battery in which a polymer compound such as polyethylene oxide is used as an electrolyte and an inorganic all-solid state secondary battery in which Li—P—S-based glass, LLT, or LLZ is used as an electrolyte. An organic compound can be applied to the inorganic all-solid state secondary battery as a hinder or an additive of the positive electrode active material, the negative electrode active material, and the inorganic solid electrolyte without any interference.

The inorganic solid electrolyte is distinguished from the electrolyte (polymer electrolyte) in which a polymer compound functions as an ion conducting medium, and an inorganic compound functions as an ion conducting medium. Specific examples of the inorganic solid electrolyte include Li—P—S-based glass, LLT, and LLZ. The inorganic solid electrolyte itself does not emit cations (Li ions) and has an ion transport function. On the other hand, a material as an ion donor that is added to an electrolytic solution or a solid electrolyte layer and emits cations (Li ions) will be referred to as an electrolyte. This electrolyte will be referred to as "electrolyte salt" or "supporting electrolyte" in order to distinguish from the electrolyte as the ion transport material. Examples of the electrolyte salt include LiTFSI.

"Composition" described in the present invention refers to a mixture in which two or more components are uniformly mixed. This composition is not particularly limited as long as it substantially maintains uniformity, in which aggregation or uneven distribution may occur within a range where the desired effect can be exhibited.

EXAMPLES

Hereinafter, the present invention will be described in more detail on the basis of examples. Meanwhile, the present invention is not interpreted to be limited thereto.

Synthesis of Sulfide-Based Inorganic Solid Electrolyte

Synthesis of Li—P—S-Based Glass

As a sulfide-based inorganic solid electrolyte, Li—P—S-based glass was synthesized with reference to a non-patent document of T. Ohtomo, A. Hayashi, M. Tatsumisago, Y Tsuchida, S. HamGa, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphoruspentasulfide ($P_2S_5$, manufactured by Aldrich-Sigma, Co. LLC. Purity: >99%) (3.90 g) were respectively weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

Sixty six zirconia beads having a diameter of 5 mm were put into a 45 mL zirconia container (manufactured by Fritsch Japan Co., Ltd.), the full amount of the mixture of the lithium sulfide and the diphosphoruspentasulfide was put thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, and a yellow powder (6.20 g) of a sulfide-based inorganic solid electrolyte (Li—P—S-based glass) was obtained. The ion conductivity was 0.28 mS/cm.

Synthesis of Polymer Dispersion

Synthesis of Macromonomer (Graft Portion)

Manufacturing Example 1 Synthesis of Macromonomer (M-1)

50 g of methyl methacrylate and 50 g of normal butyl methacrylate were added to a 500 mL three-neck flask, and 100 g of butane was added thereto to uniformly dissolve the components. Next, nitrogen purge was performed for 10 minutes while stirring the components at 80° C. 5 g of mercaptopropionic acid as a chain transfer agent was added to the three-neck flask, 1 g of V601 as an initiator was further added thereto, and the components were stirred in a nitrogen stream at 80° C. for 6 hours.

Next, after stropping the nitrogen stream to make the air dry, 5 g of glycidyl methacrylate as a terminal sealing agent, 0.1 g of TEMPO (2,2,6,6-tetramethylpiperidine-1-oxyl radical) as a polymerization inhibitor, and 0.3 g of tetrabutylammonium bromide as a sealing accelerator were added to heat and stir the components at 90° C. for 3 hours. The mass average molecular weight of the obtained polymer was 12500.

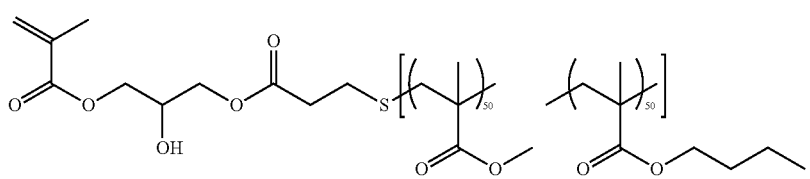

(M-1)

Manufacturing Examples 2 to 5 Synthesis of Macromonomers (M-2) to (M-5)

Macromonomers (M-2) to (M-5) were synthesized using the same synthesis method as that of the macromonomer (M-1), except that the composition was changed as shown in Table 1 below.

TABLE 1

| <Macro-monomer> | Manufacturing Example 1 M-1 | Manufacturing Example 2 M-2 | Manufacturing Example 3 M-3 | Manufacturing Example 4 M-4 | Manufacturing Example 5 M-5 |
|---|---|---|---|---|---|
| <Monomer> | | | | | |
| MMA | 50 | | | | |
| BMA | 50 | 80 | | | |
| BA | | 50 | | 80 | |
| DDA | | 50 | | | 80 |
| ST | | | | | 10 |
| AN | | | 10 | 10 | |
| HFIPMA | | | 10 | 10 | 10 |
| <Chain Transfer Agent> | | | | | |
| MPA | 5 | 5 | | | |
| MPOL | | | 5 | 5 | 5 |
| <Terminal Sealing Agent> | | | | | |
| GMA | 5 | 5 | | | |
| MOI | | | 5 | 5 | 5 |
| <Initiator> | | | | | |
| V601 | 1 | 0.5 | 3 | | |
| AIBN | | | | 3 | 1 |
| <solvent> | | | | | |
| HEP | 100 | 100 | 50 | 50 | 50 |
| MEK | | | 50 | 50 | 50 |
| Mass Average Molecular Weight | 12500 | 21050 | 6700 | 8900 | 13200 |

Notes in Table

MMA: methyl methacrylate

BMA: normal butyl methacrylate

BA: normal butyl acrylate

DDA: dodecyl methacrylate

ST: styrene

AN: acrylonitrile

HFIPMA: 1,1,1,3,3,3-hexafluoroisopropyl methacrylate

MPA: 3-sulfanylpropionic acid

MPOL: mercaptopropanol

GMA: glycidyl methacrylate

MOI: 2-methacryloyloxyethyl isocyanate (manufactured by Showa Denko K. K., trade name KARENZ MOI)

V601: dimethyl 2,2'-azobis(isobutyrate)

AIBN: azoisobutyronitrile

HEP: normal heptane

MEK: methyl ethyl ketone

The unit of the amount used is "g".

Manufacturing Example 6 Synthesis of Polymer Particles (A-1)

20 g of the macromonomer (M-1) was added to a 500 mL three-neck flask, and one half of 150 g of heptane was added thereto to uniformly dissolve the components. Next, nitrogen purge was performed for 10 minutes while stirring the components at 80° C. On the other hand, 50 g of methyl acrylate, 20 g of polyethylene glycol monomethyl monomethacrylate (number-average molecular weight (Mn) 1000), 10 g of acrylic acid, and 1 g of V601 as an initiator were added to an Erlenmeyer flask, and the other half of the heptane was added to uniformly dissolve the components. As a result, a monomer solution was prepared. This monomer solution was added dropwise to a three-neck flask for 4 hours. After completion of the dropwise addition, the solution was heated and stirred at 80° C. for 4 hours. As the polymerization progresses, a polymer solution was suspended. As a result, polymer particles (A) were obtained.

Manufacturing Examples 7 to 13 Synthesis of Polymer Particles (A-2) to (A-8)

Polymer particles (A-2) to (A-8) were synthesized using the same synthesis method as that of the polymer particles (A-1), except that the composition was changed as shown in Table 2 below.

TABLE 2

| | Manufacturing Example 6 | Manufacturing Example 7 | Manufacturing Example 8 | Manufacturing Example 9 | Manufacturing Example 10 | Manufacturing Example 11 | Manufacturing Example 12 | Manufacturing Example 13 |
|---|---|---|---|---|---|---|---|---|
| | \<Polymer Particles (A)\> | | | | | | | |
| | A-1 | A-2 | A-3 | A-4 | A-5 | A-6 | A-7 | A-8 |
| \<Macromonomer\> | | | | | | | | |
| M-1 | 20 | | | | | | 10 | 10 |
| M-2 | | 20 | | | | | | |
| M-3 | | | 20 | | | | | |
| M-4 | | | | 20 | | | | |
| M-5 | | | | | 20 | | | |
| M-6 | | | | | | 20 | | |
| \<Monomer\> | | | | | | | | |
| MA | 50 | 50 | 50 | | 50 | 50 | 30 | 30 |
| PEGMA | 20 | 20 | 20 | | | | | |
| ST | | | | 50 | 10 | | | |
| AA | 10 | | | 10 | 10 | 10 | 10 | |
| DMAPMAd | | 10 | | | | | | 10 |
| HEA | | | 10 | 10 | | | 10 | 10 |
| AN | | | | 10 | | | 10 | 10 |
| BD | | | | | 10 | | 10 | 10 |
| VDT | | | | | | 10 | 10 | 10 |
| HFP | | | | | | 10 | 10 | 10 |
| \<Initiator\> | | | | | | | | |
| V601 | 1 | 1 | 1 | 1 | 1 | | | |
| AIBN | | | | | | 1 | 1 | 1 |
| \<Solvent\> | | | | | | | | |
| HEP | 150 | | | | | | 50 | 50 |
| IBIB | | 150 | 150 | 150 | | | 100 | 100 |
| DIBK | | | | | 150 | | | |
| DBE | | | | | | 150 | | |
| Mass Average Molecular Weight | 45300 | 54600 | 69300 | 58900 | 98400 | 76500 | 64100 | 55500 |
| Average Particle Size | 250 | 180 | 110 | 320 | 700 | 290 | 280 | 410 |
| Peak Particle Size | 250 | 180 | 110 | 140/350 | 700 | 290 | 280 | 410 |

Notes in Table

MA: methyl acrylate
PEGMA: polyethylene glycol monomethyl monomethacrylate (Mn 1000)
ST: styrene
AA: acrylic acid
DMAPMAd: N-(3-dimethylaminopropyl)methacrylamide
HEA: 2-hydroxyethyl acrylate
AN: acrylonitrile
BD: 1,3-butadiene
VDF: vinylidene difluoride
HFP: hexafluoroisoprene
IBIB: isobutyl isobutyrate
DIBK: diisobutyl ketone
DBE: dibutyl ether
M-6: methacryl single end type reactive modified silicone X-22-2426 (trade name, manufactured by Shin-Etsu Chemical Co., Ltd.)
The unit of the amount used is "g".
"140/350" of polymer particles A-4 represents that maximum peaks are present at 140 nm and 350 nm.

Example 1 Preparation of Binder Composition for All-Solid State Secondary Battery 10 g of the polymer particles (A-2) and 10 g of the polymer particles (A-1) were added to a 100 mL three-neck flask and were stirred at 150 rpm for 30 minutes. As a result, a binder composition CMP-1 for an all-solid state secondary battery as a uniform dispersion liquid was obtained. Under dispersion conditions (rotation speed, time) herein, the diameter of the polymer particles (A) did not substantially change.

Examples 2 to 12 and Comparative Examples 1 to 4 Preparation of Binder Composition for All-Solid State Secondary Battery Binder compositions for an all-solid state secondary battery according to Examples 2 to 12 and Comparative Examples 1 to 4 were prepared using the same preparation method as that of the binder composition for an all-solid state secondary battery according to Example except that the composition was changed as shown in Table 3 below.

Example 1 Preparation of Binder Sheet

The binder composition CMP-1 for an all-solid state secondary battery was dip cast on an aluminum foil to obtain a binder sheet having a thickness of 100 μm (thickness excluding the thickness of the aluminum foil).

Examples 2 to 12 and Comparative Examples 1 to 4 Preparation of Sheet Using Binder Composition for All-Solid State Secondary Battery Binder sheets according to Examples 2 to 12 and Comparative Examples 1 to 4 were prepared using the same method as that of the binder sheet according to Example 1, except that binder compositions for an all-solid state secondary battery according to Examples 2 to 12 and Comparative Examples 1 to 4 were used.
The particle size was measured using a method of measuring a particle size and a particle size distribution described below. A sample (dispersion) for measurement was prepared using a method of preparing the above-described composition.

Method of Measuring Particle Size and Particle Size Distribution

Figure 4:
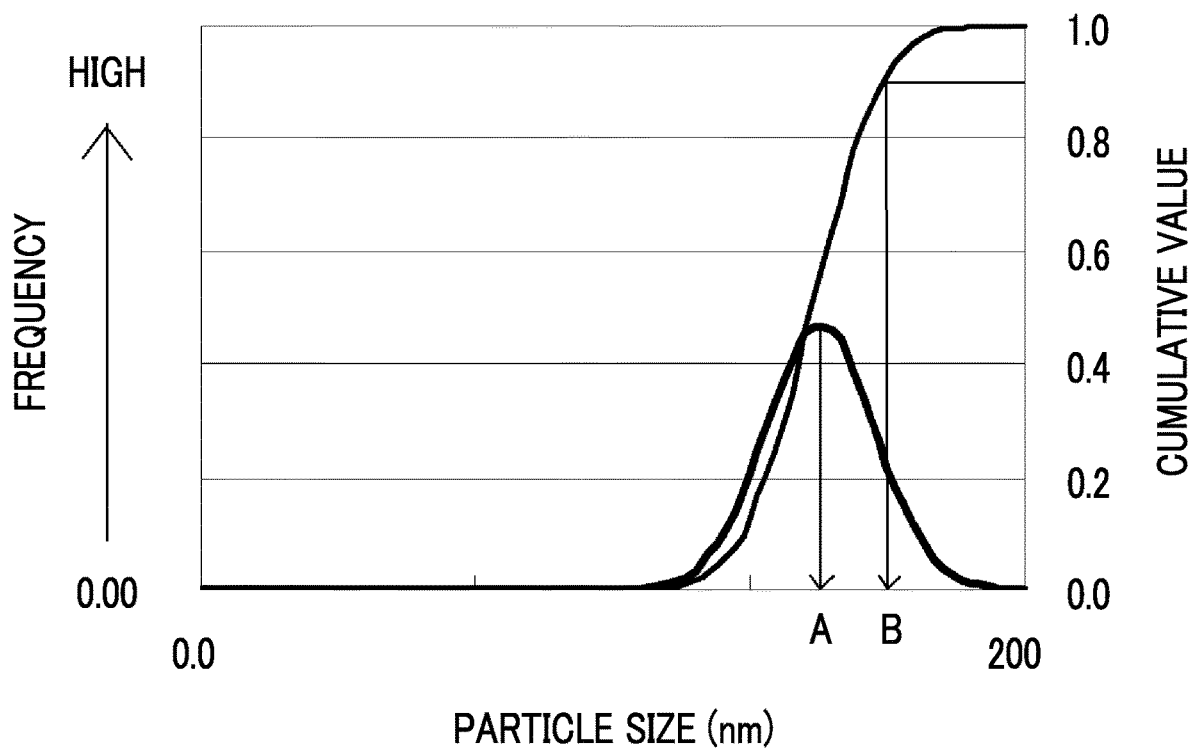
FIG. 4 is a diagram illustrating a particle size distribution of polymer particles (A).

Using a dynamic light scattering particle size distribution analyzer (LB-500 (trade name), manufactured by Horiba Ltd.) according to JIS 8826:2005, the polymer particles (A) dispersion was collected in a 20 ml sample bottle and was diluted with toluene such that the concentration of solid contents was 0.2 mass %. Data of the obtained dilute solution was acquired 50 times using a 2 ml quartz cell for measurement at a temperature of 25° C., and the obtained volume average was obtained as the average particle size (corresponding to A of FIG. 4). In addition, a particle size corresponding to a cumulative value 90% in a cumulative particle size distribution in order from the smallest particle size was obtained as a cumulative 90% particle size (corresponding to B of FIG. 4). The average particle size of particles before mixing was measured using this method.

Waveform Separation Method of Measured Value

The particle size and the cumulative 90% particle size of the polymer particles (A) before mixing can be estimated by assuming a logarithmic normal distribution from the particle size distribution measurement result of the polymer particles (A) after mixing and performing waveform separation using a least-squares method. Specifically, the particle size of the polymer particles (A) dispersion after mixing was measured using a dynamic light scattering particle size distribution analyzer (LB-500 (trade name) manufactured by Horiba Ltd.), and the waveform separation of the obtained measurement result was performed using a solver function in Excel (spread sheet software manufactured by Microsoft Corporation). As a result, the particle sizes and the cumulative 90% particle size of the polymer particles (A) before mixing were calculated. It was verified that the average particle size and the cumulative 90% particle size calculated as described above matched well with the average particle size and the cumulative 90% particle size before the preparation. The results are shown in Table 1.

Test

The following was performed using the binder sheets according to Examples 1 to 12 and Comparative Examples 1 to 4. The results are collectively shown in Table 3 below.

Cracking after Application

The number of cracks (cracks having a width of 1 μm or more and a length of 10 μm or more) in a sheet having a diameter of 14.5 mm was counted using an optical microscope (×100). The evaluation standards are as follows. B or higher is an acceptable level of the present test.

Evaluation Standards

A: 0
B: 1
C: 2.
D: 3 or more and less than 10
E: 10 or more

Cracking after Pressing

The number of cracks (cracks having a width of 1 μm or more and a length of 10 μm or more) in a sheet having a diameter of 14.5 mm was counted using an optical microscope (×100). The evaluation standards are as follows. B or higher is an acceptable level of the present test.

Evaluation Standards

A: 0
B: 1
C: 2
D: 3 or more and less than 10
E: 10 or more

TABLE 3

| | Binder Composition for All-Solid State Secondary Battery | Polymer Particles (Aa) | Polymer Particles (Ab) | Mixing Mass Ratio | Non-Aqueous Dispersion Solvent | Mixing Mass Ratio | Moisture Content in Composition (ppm) | Particle Size of Minimum Peak | Particle Size of Maximum Peak | Pa/Pb | Cracking after Application | Cracking after Pressing |
|---|---|---|---|---|---|---|---|---|---|---|---|---|
| Example 1 | CMP-1 | A-2 | A-1 | 50/50 | HEP/IBIB | 50/50 | 100 | 180 | 250 | 0.72 | B | B |
| Example 2 | CMP-2 | A-2 | A-4 | 50/50 | IBIB | — | 50 | 160 | 330 | 0.48 | B | B |
| Example 3 | CMP-3 | A-2 | A-5 | 50/50 | IBIB/DIBK | 50/50 | 70 | 150 | 730 | 0.21 | A | B |
| Example 4 | CMP-4 | A-2 | A-6 | 40/60 | IBIB/DBE | 40/60 | 50 | 180 | 300 | 0.60 | A | A |
| Example 5 | CMP-5 | A-2 | A-7 | 30/70 | HEP/IBIB | 30/70 | 65 | 170 | 750 | 0.68 | B | A |
| Example 6 | CMP-6 | A-2 | A-8 | 20/80 | HEP/IBIB | 20/80 | 95 | 130 | 450 | 0.29 | A | A |
| Example 7 | CMP-7 | A-3 | A-1 | 50/50 | HEP/IBIB | 50/50 | 90 | 110 | 220 | 0.50 | A | A |
| Example 8 | CMP-8 | A-3 | A-4 | 50/50 | IBIB | — | 10 | 120 | 250 | 0.48 | A | A |
| Example 9 | CMP-9 | A-3 | A-5 | 50/50 | IBIB/DIBK | 50/50 | 25 | 100 | 720 | 0.14 | A | A |
| Example 10 | CMP-10 | A-3 | A-6 | 60/40 | IBIB/DBE | 60/40 | 10 | 90 | 290 | 0.31 | A | A |
| Example 11 | CMP-11 | A-3 | A-7 | 70/30 | HEP/IBIB | 70/30 | 10 | 100 | 280 | 0.36 | A | A |
| Example 12 | CMP-12 | A-3 | A-8 | 80/20 | HEP/IBIB | 80/20 | 10 | 120 | 490 | 0.24 | A | A |
| Comparative Example 1 | HCMP-1 | HA-1a | HA-1b | 25/75 | THF | — | >1000 | 120 | 250 | 0.60 | D | D |
| Comparative Example 2 | HCMP-2 | HA-2 | — | 100 | Xylene | — | 100 | — | — | — | D | D |
| Comparative Example 3 | HCMP-3 | HA-3 | — | 100 | Dekalin | — | 72 | 120 | — | — | E | E |
| Comparative Example 4 | HCMP-4 | A-1 | — | 100 | HEP/IBIB | 50/50 | 100 | 250 | — | — | C | D |

Notes in Table

HA-1a: polymer particles P3 described in WO02013/008564A were used
HA-1b: polymer particles P4 described in WO02013/008564A were used
HA-2: a graft polymer 1 described in Example 1 of JP2011-014387A was used
HA-3: polymer particles A described in Example 1 of JP2013-008611A were used

Preparation of Solid Electrolyte Composition

Preparation of Solid Electrolyte Composition S-1

50 zirconia beads having a diameter of 3 mm were put into a 45 mL zirconia container (manufactured by Fritsch Japan Co., Ltd.), 1.5 g of an oxide-based inorganic solid electrolyte LLZ (manufactured by Toshima Manufacturing Co., Ltd.) and 0.3 g of the binder composition (CMP-1) were added thereto, and 2.5 g of PGMEA (propylene glycol 1-monomethyl ether 2-acetate) as a non-aqueous dispersion medium was put thereinto. Next, the container was set in a planetary ball mill P-7 (trade name, manufactured by Fritsch Japan Co., Ltd.) and the components were continuously mixed for 2 hours at a temperature of 25° C. and a rotation speed of 300 rpm. As a result, a solid electrolyte composition S-1 was prepared.

Preparation of Solid Electrolyte Composition S-2

50 zirconia beads having a diameter of 3 mm were put into a 45 mL zirconia container (manufactured by Fritsch Japan Co., Ltd.), 1.5 g of the sulfide-based inorganic solid electrolyte Li—P—S-based glass synthesized as described above (manufactured by Toshima Manufacturing Co. Ltd.) and 0.3 g of the binder composition (CMP-2) were added thereto, and 2.5 g of heptane as a non-aqueous dispersion medium was put thereinto. Next, the container was set in a planetary ball mill P-7 (trade name, manufactured by Fritsch Japan Co., Ltd.) and the components were continuously stirred for 2 hours at a temperature of 25° C. and a rotation speed of 300 rpm. As a result, a solid electrolyte composition S-2 was prepared.

Preparation of Solid Electrolyte Compositions S-3 to S-12 and HS-1 to HS-3

Solid electrolyte compositions S-3 to S-12 and HS-1 to HS-3 were prepared using the same method as that of the solid electrolyte composition S-2, except that the composition was changed as shown in Table 4 below.

Preparation of Solid Electrolyte-Containing Sheet SS-1

The solid electrolyte composition S-1 shown in Table 4 below was applied to a release sheet (thickness: 30 μm, manufactured by Lintec Corporation) using a bar coater set to clearance of 100 μm and was dried on a hot plate at 80° C. for 20 minutes. As a result, a solid electrolyte-containing sheet SS-1 (thickness of solid electrolyte layer: 30 μm) was formed. SS-1 was obtained by press-forming at a pressure of 350 MPa.

Preparation of Solid Electrolyte-Containing Sheets SS-2 to SS-12 and cHS-1 to cHS-3

Solid electrolyte-containing sheets SS-2 to SS-12 and cHS-1 to cHS-3 were prepared using the same method as that of the solid electrolyte-containing sheet SS-1, except that the solid electrolyte compositions S-2 to S-12 and HS-1 to HS-3 were used instead of the solid electrolyte composition S-1. The thickness of the solid electrolyte layer was 30 μm.

The above-described measurement and the measurement of the ion conductivity of the solid electrolyte layer described below were performed using the solid electrolyte-containing sheets SS-1 to SS-12 and cHS-1 to cHS-3. The results are collectively shown in Table 4 below.

Ion Conductivity of Solid Electrolyte Layer

Two solid electrolyte-containing sheets obtained as described were punched in a disk shape having a diameter of 13.5 mmφ and were laminated such that coating surfaces (surfaces of the solid electrolyte layers) overlapped each other. As a result, a solid electrolyte-containing sheet 15 in which the total thickness of the solid electrolyte layers was 60 μm was obtained, and the ion conductivity thereof was measured using an impedance method.

Figure 3:
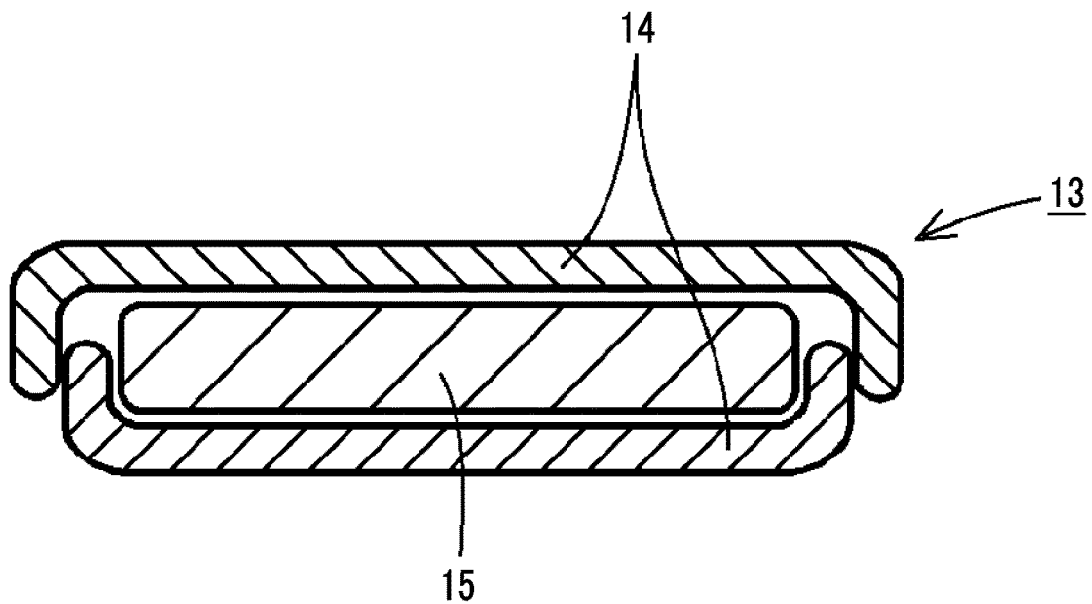
FIG. 3 is a vertical cross-sectional view schematically illustrating a coin-type jig prepared in Examples.

300 mg of the solid electrolyte-containing sheet 15 in which the coating surfaces overlapped each other was filled into a cylinder having a diameter of 14.5 mm, and a spacer and a washer (both of which are not illustrated in FIG. 3) were incorporated thereinto to prepare a coin-type jig 13. A jig capable of applying a pressure of 49 MPa was interposed between electrodes from the outside of the coin-type jig 13 and was used to measure the ion conductivity.

Figure 2:
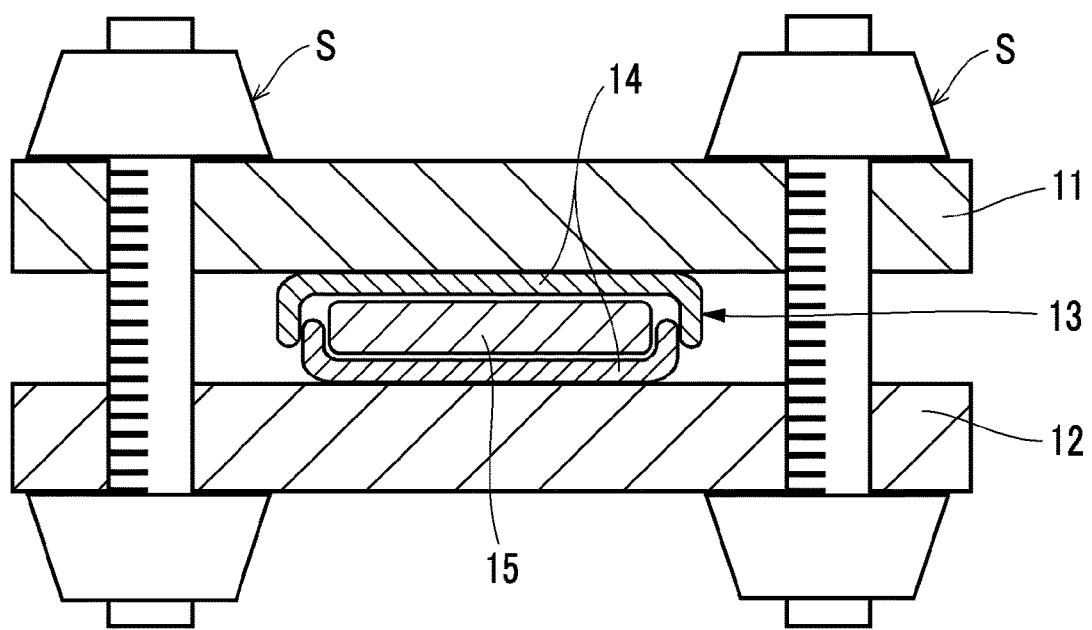
FIG. 2 is a vertical cross-sectional view schematically illustrating a device used in Examples.

The ion conductivity of the coin-type jig 13 obtained as described above was obtained using an alternating current impedance method in a constant-temperature tank at 30° C. in a state where the coin-type jig 13 was pressurized (49 MPa). At this time, in order to pressurize the coin-type jig 13, a test specimen illustrated in FIG. 2 was used. 11 represents an upper support plate, 12 represents a lower support plate, 13 represents a coin-type jig, and S represents a screw.

Ion Conductivity(mS/cm)=1000×Sample Thickness (cm)/(Resistance(Ω)×Sample Area(cm$^2$))    Expression (a)

The evaluation standards are as follows. B or higher is an acceptable level of the present test.

Evaluation Standards

A: 0.5 mS/cm or higher

B: 0.4 mS/cm or higher and lower 0.5 mS/cm

C: 0.3 mS/cm or higher and lower 0.4 mS/cm

D: 0.1 mS/cm or higher and lower 0.3 mS/cm

E: lower than 0.1 mS/cm

Regarding the positive electrode sheet and the negative electrode sheet described below, the ion conductivity was measured as described above.

TABLE 4

| Solid Electrolyte-Containing Sheet | Solid Electrolyte Composition | Moisture Content in Composition (ppm) | Binder Composition | | Inorganic Solid Electrolyte (C) | | Non-Aqueous Dispersion Medium (B) | | Performance of Solid Electrolyte-Containing Sheet | | |
|---|---|---|---|---|---|---|---|---|---|---|---|
| | | | Kind | Part(s) by Mass | Kind | Part(s) by Mass | Kind | Part(s) by Mass | Cracking after Application | Cracking after Pressing | Ion Conductivity |
| SS-1 | S-1 | 80 | CMP-1 | 0.3 | LLZ | 1.5 | PGMEA | 2.5 | B | B | B |
| SS-2 | S-2 | 70 | CMP-2 | 0.3 | Li/P/S | 1.5 | Heptane | 2.5 | B | B | B |
| SS-3 | S-3 | 60 | CMP-3 | 0.3 | Li/P/S | 1.5 | Heptane | 2.5 | A | B | B |
| SS-4 | S-4 | 50 | CMP-4 | 0.3 | Li/P/S | 1.5 | Heptane | 2.5 | A | A | A |
| SS-5 | S-5 | 50 | CMP-5 | 0.3 | Li/P/S | 1.5 | Heptane | 2.5 | B | A | A |
| SS-6 | S-6 | 50 | CMP-6 | 0.3 | Li/P/S | 1.5 | Toluene | 2.5 | A | A | A |
| SS-7 | S-7 | 30 | CMP-7 | 0.3 | Li/P/S | 1.5 | Toluene | 2.5 | A | A | B |
| SS-8 | S-8 | 30 | CMP-8 | 0.3 | Li/P/S | 1.5 | IBIB | 2.5 | A | A | B |
| SS-9 | S-9 | 30 | CMP-9 | 0.3 | Li/P/S | 1.5 | Octane | 2.5 | A | A | B |
| SS-10 | S-10 | 30 | CMP-10 | 0.3 | Li/P/S | 1.5 | IBIB | 2.5 | A | A | A |
| SS-11 | S-11 | 30 | CMP-11 | 0.3 | Li/P/S | 1.5 | IBIB | 2.5 | A | A | A |
| SS-12 | S-12 | 30 | CMP-12 | 0.3 | Li/P/S | 1.5 | IBIB | 2.5 | A | A | A |
| cHS-1 | HS-1 | 50 | HCMP-1 | 0.3 | Li/P/S | 1.5 | PGMEA | 2.5 | D | D | E |
| cHS-2 | HS-2 | 50 | HCMP-2 | 0.3 | Li/P/S | 1.5 | Heptane | 2.5 | D | D | D |
| cHS-3 | HS-3 | 50 | HCMP-3 | 0.3 | Li/P/S | 1.5 | Heptane | 2.5 | E | E | C |
| cHS-4 | HS-4 | 80 | HCMP-4 | 0.3 | LLZ | 1.5 | PGMEA | 2.5 | C | D | D |

In the solid electrolyte-containing sheets cHS-1 to MS-3 not satisfying the regulations of the present invention, the results of the cracking test after application and the cracking test after pressing were unacceptable, and the ion conductivity was unacceptable.

On the other hand, in the solid electrolyte-containing sheets SS-1 to SS-12 according to the present invention, the results of all the tests were acceptable. It can be seen from the results that, in the all-solid state secondary battery including, as the solid electrolyte layer, the solid electrolyte-containing sheet prepared using the binder composition for an all-solid state secondary battery according to the embodiment of the present invention, an effect of suppressing short-circuiting is excellent.

Preparation of Positive Electrode Composition 50 zirconia beads having a diameter of 3 mm were put into a 45 mL zirconia container (manufactured by Fritsch Japan Co., Ltd.), 0.8 g of the sulfide-based inorganic solid electrolyte Li—P—S-based glass synthesized as described above, 2.8 g of a positive electrode active material (NMC), 0.1 g of a conductive auxiliary agent (acetylene black), and 0.036 g of the binder composition (CMP-1) were added thereto, and 2.5 g of isobutyl isobutyrate as a non-aqueous dispersion medium was put thereinto. Next, the container was set in a planetary ball mill P-7 (trade name, manufactured by Fritsch Japan Co., Ltd.) and the components were continuously stirred for 2 hours at a temperature of 25° C. and a rotation speed of 300 rpm. As a result, a positive electrode composition was prepared.

Preparation and Test of Positive Electrode Sheet for All-Solid State Secondary Battery A positive electrode sheet for an all-solid state secondary battery was prepared using the positive electrode composition with the same preparation method as that of the solid electrolyte-containing sheet, and the above-escribed test was performed using the positive electrode sheet for an all-solid state secondary battery. The result of the cracking test after application was A, the result of the cracking test after pressing was A, and the result of the ion conductivity of the positive electrode active material layer was A.

Preparation of Negative Electrode Composition

A negative electrode composition was prepared using the same method as that of the positive electrode composition, except that graphite as a negative electrode active material was used instead of the positive electrode active material.

Preparation and Test of Negative Electrode Sheet for All-Solid State Secondary Battery A negative electrode sheet for an all-solid state secondary battery was prepared using the negative electrode composition with the same preparation method as that of the solid electrolyte-containing sheet, and the above-escribed test was performed using the negative electrode sheet for an all-solid state secondary battery. The result of the cracking test after application was A, the result of the cracking test after pressing was A, and the result of the ion conductivity of the positive electrode active material layer was A.

The present invention has been described using the embodiments. However, unless specified otherwise, any of the details of the above description is not intended to limit the present invention and can be construed in a broad sense within a range not departing from the concept and scope of the present invention disclosed in the accompanying claims.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: upper support plate
12: lower support plate
13: coin-type jig
14: 2032-type coin case
15: solid electrolyte-containing sheet or positive electrode or negative electrode sheet
S: screw

What is claimed is:

1. A binder composition for an all-solid state secondary battery comprising polymer particles (A) and a non-aqueous dispersion medium (B),
    wherein the polymer particles (A) are formed of a graft polymer not including a surfactant and having two or more peaks in a scattering intensity distribution measured by a dynamic light scattering particle size distribution analyzer, and
    a moisture content of the composition is 100 ppm or lower by mass.

2. The binder composition for an all-solid state secondary battery according to claim 1,
    wherein among the two or more peaks in the scattering intensity distribution, a peak (Pa) of a minimum particle size is in a range of 10 nm or more and less than 200 nm and a peak (Pb) of a maximum particle size is in a range of 200 rim or more and less than 1000 rim.

3. The binder composition for an all-solid state secondary battery according to claim 2,
    wherein a relationship between the peak (Pa) of the minimum particle size and the peak (Pb) of the maximum particle size satisfies the following Expression (1), $$0.05 \leq Pa/Pb \leq 0.75 \tag{1}.$$

4. The binder composition for an all-solid state secondary battery according to claim 1,
    wherein the polymer particles (A) include a repeating unit derived from a (meth)acrylic acid ester.

5. The binder composition for an all-solid state secondary battery according to claim 1,
    wherein the polymer particles (A) are formed of a graft polymer having at least one functional group selected from the following group of functional groups,
    Group of Functional Groups
    a hydroxy group, a carboxy group or a salt thereof, a sulfonate group or a salt thereof, a phosphate group or a salt thereof, a cyano group, and an amino group or a salt thereof.

6. The binder composition for an all-solid state secondary battery according to claim 1,
    wherein a graft portion of the polymer particles (A) has an alkyl group having 6 to 18 carbon atoms.

7. The binder composition for an all-solid state secondary battery according to claim 1,
    wherein the non-aqueous dispersion medium (B) is at least one of a hydrocarbon compound solvent, a ketone compound solvent, an ether compound solvent, an ester compound solvent, or a nitrile compound solvent.

8. The binder composition for an all-solid state secondary battery according to claim 1, further comprising an inorganic solid electrolyte (C) having ion conductivity of a metal belonging to Group 1 or Group 2 in the periodic table.

9. The binder composition for an all-solid state secondary battery according to claim 8, further comprising an active material (D).

10. The binder composition for an all-solid state secondary battery according to claim 8, further comprising a conductive auxiliary agent (E).

11. A solid electrolyte-containing sheet comprising a layer that is formed of the binder composition for an all-solid state secondary battery according to claim 8.

12. An all-solid state secondary battery comprising a positive electrode active material layer, a negative electrode active material layer, and a solid electrolyte layer,
    wherein at least one of the positive electrode active material layer, the negative electrode active material layer, or the solid electrolyte layer is the solid electrolyte-containing sheet according to claim 11.

13. A method of manufacturing a solid electrolyte-containing sheet comprising a step of applying the binder composition for an all-solid state secondary battery according to claim 8 to a substrate.

14. A method of manufacturing an all-solid state secondary battery comprising a step of manufacturing a solid electrolyte-containing sheet through the method according to claim 13.

* * * * *